(12) United States Patent
Beale et al.

(10) Patent No.: US 11,457,463 B2
(45) Date of Patent: Sep. 27, 2022

(54) RESOURCE SCHEDULING USING PUNCTURING TECHNIQUES FOR DATA TRANSMISSION

(71) Applicant: Sony Corporation, Tokyo (JP)

(72) Inventors: Martin Beale, Weybridge (GB); Shin Horng Wong, Weybridge (GB); Basuki Priyanto, Lund (SE)

(73) Assignee: SONY CORPORATION, Tokyo (JP)

(*) Notice: Subject to any disclaimer, the term of this patent is extended or adjusted under 35 U.S.C. 154(b) by 82 days.

(21) Appl. No.: 16/968,478

(22) PCT Filed: Feb. 14, 2019

(86) PCT No.: PCT/EP2019/053643
§ 371 (c)(1),
(2) Date: Aug. 7, 2020

(87) PCT Pub. No.: WO2019/158633
PCT Pub. Date: Aug. 22, 2019

(65) Prior Publication Data
US 2021/0045146 A1    Feb. 11, 2021

(30) Foreign Application Priority Data
Feb. 16, 2018  (SE) .................... 1830053-3

(51) Int. Cl.
*H04W 72/12* (2009.01)
*H04W 72/04* (2009.01)

(52) U.S. Cl.
CPC ....... *H04W 72/1289* (2013.01); *H04W 72/04* (2013.01)

(58) Field of Classification Search
CPC . H04W 72/1289; H04W 72/04; H04W 72/14; H04W 72/044; H04W 76/046; H04W 76/27; H04W 72/1242; H04W 72/1273; H04W 88/02; H04W 88/08; H04L 5/0064; H04L 5/0087; H04L 5/0091; H04L 5/0007; H04L 5/0044
See application file for complete search history.

(56) References Cited

U.S. PATENT DOCUMENTS

| | | | |
|---|---|---|---|
| 2014/0269593 A1* | 9/2014 | Wang | H04W 72/12 370/329 |
| 2014/0302846 A1 | 10/2014 | Zou | |
| 2018/0063865 A1* | 3/2018 | Islam | H04W 76/27 |
| 2018/0199335 A1* | 7/2018 | Jung | H04L 1/1812 |
| 2020/0067676 A1* | 2/2020 | Yl | H04L 5/0048 |

FOREIGN PATENT DOCUMENTS

| | | |
|---|---|---|
| WO | 2016170425 A1 | 10/2016 |
| WO | 2018012550 A1 | 5/2019 |

OTHER PUBLICATIONS

U.S. Appl. No. 62/492,933 (Year: 2017).*
(Continued)

*Primary Examiner* — Ian N Moore
*Assistant Examiner* — Rushil Parimal Sampat
(74) *Attorney, Agent, or Firm* — Tucker Ellis LLP

(57) ABSTRACT

A method includes receiving scheduling information for a transmission on a plurality of resource blocks. The method also includes, based on control information on at least one invalid resource block included in the plurality of resource blocks, blocking the transmission on the at least one invalid resource block.

22 Claims, 13 Drawing Sheets

(56) References Cited

OTHER PUBLICATIONS

International Search Report and Written Opinion from corresponding International Application No. PCT/EP2019/053643, dated May 17, 2019, 13 pages.
Vivo, "Multiplexing data with different transmission durations", 3GPP TSG RAN WG1 Meeting AH 1801, R1-1800205, Jan. 13, 2018, 6 pages.
LG Electronics, "Remaining issues on UL data transmission procedure", 3GPP TSG RAN WG1 Meeting AH 1801, R1-1800382, Jan. 13, 2018, 13 pages.
Orange, AT&T, "On the Interest of more flexible source allocation for efeMTC", 3GPP TSG-RAN WG1 Meeting #91, R1-1721286, Nov. 27-Dec. 1, 2017, 4 pages.
NTT Docomo, Inc., "UL data transmission procedures", 3GPP TSG RAN-WG1 Meeting #91, R1-1720824, Nov. 27-Dec. 1, 2017, 12 pages.
Ericsson: "Flexible PDSCH/PUSCH resource allocation for MTC", 3GPP TSG-RAN WG1 Meeting #90, R1-1712988, Aug. 21-25, 2017, 3 pages.
NTT Docomo, "Time and Frequency Relationship for MPDSCH and PDSCH", 3GPP TSG RAN WG1 Meeting #81, R1-153320, May 25-29, 2015, 6 pages.
Japanese Office Action from corresponding Japanese Patent Application No. 2020-543769, dated Sep. 7, 2021, 4 pages.
Vivo: "Discussion on handling UL multiplexing of transmissions with different reliability requirements"; 3GPP TSG RAN WG1 Meeting #92, R1-1801550; dated Feb. 26-Mar. 2, 2018; 7 pages.

\* cited by examiner

RESOURCE SCHEDULING USING PUNCTURING TECHNIQUES FOR DATA TRANSMISSION

TECHNICAL FIELD

Various examples of the invention generally relate to scheduling of transmissions. Various examples of the invention specifically relate to puncturing transmissions, and blocking transmissions on at least one forbidden resource block.

BACKGROUND

To accommodate for Internet of Things (IOT) traffic, various work items in the Third Generation Partnership Project (3GPP) have been defined. Examples include Further Enhanced Machine Type Communications (feMTC), see 3GPP RP-161464; Enhanced Narrowband IOT (eNB-IOT), see 3GPP RP-161901; Even Further Enhanced Machine Type Communications (efeMTC), see 3GPP RP-170732; and Further Enhanced Narrowband Internet of Things (feNB-IOT), see 3GPP RP-170852.

Such concepts for IOT traffic often rely on transmission on a subband (sometimes also referred to as narrowband) of a carrier for IOT-terminals (UEs). Non-IOT UEs transmit on the entire bandwidth of the non-IOT traffic. Hence, a plurality of resource blocks (often referred to as physical resource block, PRB)—each PRB including multiple time-frequency resource elements (often referred to as physical resource element, PRE) of a time-frequency resource grid—are associated with the subband and therefore allocated to the IOT traffic.

In order to reduce complexity of the radio frequency front and of an IOT UE, the bandwidth of the subband is reduced if compared to the overall bandwidth of the carrier. For example, typical bandwidths of the subband are in the range of 1-2 MHz, while the bandwidth of the carriers in the range of 1-20 MHz, or even larger.

Further, typically different scheduling strategies are employed for scheduling a first transmission of IOT traffic on the subband and for scheduling a second transmission of non-IOT traffic outside of the subband. For example, different formats of scheduling information can be used for scheduling the first transmission and for scheduling the second transmission. For example, for scheduling the transmission on the subband, a Downlink Control Information (DCI) format 6-1B can be used according to 3GPP Technical Specification (TS) 36.212, version 15.0.0 (December 2017), section 5.3.3.1.13. Differently, for scheduling the transmission outside the subband, a DCI format 0 according to 3GPP TS 36.212, version 15.0.0 (December 2017), section 5.3.3.1.1 can be used.

It has been observed that due to different formats of the scheduling information used for scheduling of the transmission on the subband and for scheduling of the transmission outside of the subband, ambiguities can result. This can degrade the system reliability and/or spectral efficiency.

Further, on a general level, it has been observed that due to different requirements of IOT traffic and non-IOT traffic—e.g., in terms of contiguous channel access, etc.—flexibility in scheduling can be limited. This can increase latency.

On an even more general level, it has been observed that coexistence of transmissions with different requirements—e.g., in terms of format of the scheduling information, duration, bandwidth, etc.—on a common carrier can complicate the scheduling of these transmissions.

SUMMARY

Therefore, a need exists for advanced techniques of scheduling. In particular, a need exists for advanced scheduling techniques which overcome or mitigate at least some of the above-identified restrictions and drawbacks.

This need is met by the features of the independent claims. The features of the dependent claims define embodiments.

A method includes receiving scheduling information for a transmission on a plurality of resource blocks. The method also includes, based on control information on at least one forbidden resource block included in the plurality of resource blocks, blocking the transmission on the at least one forbidden resource block.

A computer program product or a computer program includes program code. The program code can be executed by at least one processor. Executing the program code causes the at least one processor to perform a method. The method includes receiving scheduling information for a transmission on a plurality of resource blocks. The method also includes, based on control information on at least one forbidden resource block included in the plurality of resource blocks, blocking the transmission on the at least one forbidden resource block.

A terminal includes control circuitry configured to: receive scheduling information for a transmission on a plurality of resource blocks; and based on control information on at least one forbidden resource block included in the plurality of resource blocks: block the transmission on the at least one forbidden resource block.

A method includes transmitting scheduling information for a transmission on a plurality of resource block. The transmission is blocked on at least one forbidden resource block included in the plurality of resource blocks.

A computer program product or a computer program includes program code. The program code can be executed by at least one processor. Executing the program code causes the at least one processor to perform a method. The method includes transmitting scheduling information for a transmission on a plurality of resource block. The transmission is blocked on at least one forbidden resource block included in the plurality of resource blocks.

An access node includes control circuitry configured to transmit scheduling information for a transmission on a plurality of resource block. The transmission is blocked on at least one forbidden resource block included in the plurality of resource blocks.

A method includes scheduling a first transmission between an access node and a first terminal.

The method further includes puncturing the first transmission on at least one forbidden resource block. The method further includes scheduling a second transmission between the access node and a second terminal on the at least one forbidden resource block.

A computer program product or a computer program includes program code. The program code can be executed by at least one processor. Executing the program code causes the at least one processor to perform a method. The method includes scheduling a first transmission between an access node and a first terminal. The method further includes puncturing the first transmission on at least one forbidden resource block. The method further includes scheduling a second transmission between the access node and a second terminal on the at least one forbidden resource block.

An access node includes control circuitry configured to schedule a first transmission between an access node and a first terminal; and puncture the first transmission on at least one forbidden resource block; and schedule a second transmission between the access node and a second terminal on the at least one forbidden resource block.

For example, the first transmission may allocate a first bandwidth. The second transmission may allocate a second bandwidth. The second bandwidth may be larger than the first bandwidth, e.g., at least by a factor of 2 or at least by a factor of 5.

For example, the first transmission may be for IOT traffic; and the second transmission may be for non-IOT traffic. For example, the first UE may be an IOT UE; and the second UE may be a non-IOT UE.

For example, the first transmission may have a first transmission duration. For example, the second transmission may have a second transmission duration. The first transmission duration may be larger than the second transmission duration, e.g., by at least a factor of 2 or at least by a factor of 5.

For example, a format of scheduling information for said scheduling of the first transmission may be different from a format of scheduling information for said scheduling of the second transmission. For example, different groups of PRBs may be used for scheduling, which may not be aligned.

Puncturing can be in at least one of time domain and frequency domain. Hence, the first transmission may be interrupted in at least one of time domain and frequency domain.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
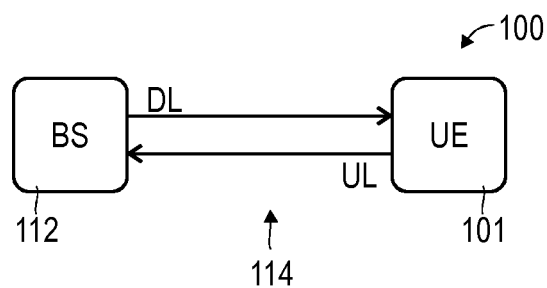
FIG. 1 schematically illustrates a network including a wireless link between a BS and a UE according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof. Same reference signs in the various drawings refer to similar or identical components, functions or actions.

Hereinafter, techniques of wireless communication are described. Transmission of data on a wireless link is possible. Transmission of data includes transmitting data and/or receiving data. For example, uplink (UL) data may be communicated from a UE to an access node such as a base station (BS). Alternatively or additionally, downlink (DL) data may be communicated from the access node, e.g., the BS, to the UE.

For example, application data may be communicated. Application data is often also referred to as payload data user data. Application data may be defined on Layer 7 of an Open Systems Interface (OSI) transmission protocol stack. It would also be possible to communicate higher-layer control data, e.g., Layer 2 or Layer 3 control data, e.g., Radio Resource Control (RRC) control data.

The wireless communication can be supported by a BS of a cellular network. Hereinafter, for sake of simplicity, reference is primarily made to cellular networks and BSs; however, similar techniques may be readily applied to other kinds and types of access nodes of other kinds and types of networks.

In the various examples described herein, IOT traffic and non-IOT traffic is described. IOT traffic is between a BS and an IOT UE. Non-IOT traffic is between a BS and a non-IOT UE. Typically, non-IOT traffic includes a transmission allocation PRBs that are spread across the entire bandwidth of a carrier. The carrier may include multiple subcarriers. Some of these subcarriers may be associated with a subband of the carrier. Transmissions of IOT traffic are typically allocated to a subband.

Often, the transmission of IOT traffic has a smaller bandwidth, but a larger transmission duration if compared to a transmission of non-IOT traffic.

Specifically for transmissions of IOT traffic, a set of features where a comparably large coverage is achieved is referred to as Coverage Enhancement (CE). CE is envisioned to be applied for MTC and NB-IOT. A key feature of the CE is to implement multiple transmission repetitions of signals; thereby multiple repetitions of encoded data are facilitated. This typically increases the transmission duration. Each repetition may include the same redundancy version of the data. The repetitions may be "blind", i.e., may not in response to a respective retransmission request that may be defined with respect to a Hybrid Acknowledgment Repeat Request protocol (HARQ protocol). Rather, repetitions according to CE may be preemptive. Examples are provided by the 3GPP Technical Report (TR) 45.820 version 13.0.0 (August 2015), section 6.2.1.3. By employing an appropriate CE policy, a likelihood of successful transmission can be increased even in scenarios of poor conditions of communicating on a corresponding wireless link. Robustness against channel fading is increased. Thereby, the coverage of networks can be significantly enhanced—even for low transmission powers as envisioned for the IOT domain.

According to various examples, a CE policy is employed for transmission between the UE and the network. The CE policy may define a repetition level. Messages or signals including a given redundancy version of encoded data are repeatedly communicated according to the repetition level: According to examples, a message is redundantly communicated using a plurality of repetitions. The message may include data which is encoded according to one and the same redundancy version: Hence, the same encoded data may be redundantly communicated a number of times according to various examples. Typically, different redundancy versions correspond to checksums of different length. In other examples, it would also be possible that different redundancy version employ checksums of the same length, but encoded according to the different coding scheme. Alternatively or additionally, different redundancy versions may employ different interleaving schemes. Each repetition of the plurality of repetitions can include the data encoded according to the same redundancy version, e.g., redundancy version 0 or redundancy version 1, etc. Then, it is possible to combine the plurality of repetitions of the encoded data at the receiver side. I.e., multiple received instances of the message may be combined. Such combination may be implemented in analog or digital domain, e.g., in the baseband. The combination yields a combined signal. Then, the decoding of the encoded data can be based on the combined signal. Thus, by aggregating the received information across the multiple repetitions, the probability of successfully decoding of the encoded signal increases. This facilitates CE. The count of repetition is sometimes referred to as the repetition level or CE level. Such techniques of CE may find particular application in the framework of the IoT technology, e.g., according to 3GPP MTC or NB-IoT. Here, typically, the transmitting UE implements a comparably low transmit power. Due to the multiple repetitions of the message, nonetheless, a sufficiently high likelihood of successfully receiving the message is provided for. The repetitions of CE may employ a frequency hopping pattern. This facilitates diversity.

The techniques described herein generally relates to scheduling of the transmission. Scheduling of the transmission may be implemented by a scheduler; typically, the scheduler is a function implemented at the BS. Scheduling may include reserving one or more time-frequency resource elements for a given transmission such that collision with other transmissions is avoided. This corresponds to allocating the one or more PREs to a given UE.

Often, PREs are allocated in groups of PRBs. A group of PRBs is referred to as resource block group (RBG). Typically, a PRB includes a number of PREs. Each PRE may be defined by a subcarrier of a carrier, e.g., according to a Orthogonal Frequency Division Multiplex (OFDM) modulation scheme; and/or may be defined in terms of a symbol of a certain duration.

According to examples, as transmission associated with IOT traffic and non-IOT traffic is scheduled by the same BS. Typically, the demands in terms of latency, contiguous channel access, etc. are different for the IOT traffic and the non-IOT traffic. Also, the format of scheduling information used for a transmission of IOT traffic and a transmission of non-IOT traffic can be different. Hereinafter, techniques are described which help to balance such different needs of transmissions associated with IOT traffic and non-IOT traffic.

According to various examples, scheduling information is communicated. The scheduling information is for a transmission on a plurality of PRBs. Then, the transmission is blocked on at least one forbidden PRB which is included in the plurality of PRBs. This is based on a respective control information. Specifically, the transmission may be blocked by a UE, e.g., an IOT UE.

The at least one forbidden PRB may be a subset of the plurality of PRBs. Hence, the transmission may be partly blocked. In some examples, it would even be possible that the transmission is fully blocked for a certain time duration if the forbidden PRBs extend across the entire bandwidth allocated to the transmission.

By blocking the transmission in the at least one forbidden PRB, ambiguities due to different formats of scheduling information can be resolved. Specifically, overlaps due to different granularity of the scheduling information used for transmission on a subband and outside of the subband can be resolved. This helps to avoid transmission errors. Further-more, spectral usage can be increased, because headroom to accommodate for potential ambiguities may be minimized or completely avoided. Further, in an associated blocking time duration, the BS can schedule another transmission. This gives the BS flexibility in scheduling transmissions of, e.g., IOT traffic and non-IOT traffic.

In detail, blocking the transmission at the UE facilitates puncturing the transmission at the BS. In other words, where the UE blocks the transmission in one or more forbidden PRBs, this facilitates insertion of a further transmission by puncturing the transmission. For example, the puncturing may facilitate interleaving a first transmission of IOT traffic and a second transmission of non-IOT traffic. The second transmission may have a shorted transmission duration; and may therefore be inserted into the blocking time duration when puncturing.

According to examples, a first transmission is scheduled between a BS and a first UE. The first transmission is then punctured on the at least one forbidden PRB. A second transmission is scheduled between the BS and a second UE—that may be different from the first UE—on the at least one forbidden PRB.

FIG. 1 schematically illustrates a wireless communication network 100 that may benefit from the techniques disclosed herein. The network may be a 3GPP-standardized cellular network such as 3G, 4G-LTE, or upcoming 5G-NR. Other examples include point-to-point networks such as Institute of Electrical and Electronics Engineers (IEEE)-specified networks, e.g., the 802.11x Wi-Fi protocol or the Bluetooth protocol. The network 100 may provide for IOT functionality including 3GPP NB-IOT or eMT, feMTC, efeMTC, etc.

The network 100 includes a BS 112 and a UE 101. A wireless link 114 is established between the BS 112 and the UE 101. The wireless link 114 includes a DL link from the BS 112 to the UE 101; and further includes an UL link from the UE 101 to the BS 112. Time-division duplexing (TDD), frequency-division duplexing (FDD), space-division duplexing (SDD), and/or code-division duplexing (CDD) may be employed for mitigating interference between UL and DL. Likewise, TDD, FDD, SDD, and/or CDD may be employed for mitigating interference between multiple UEs communicating on the wireless link 114 (not shown in FIG. 1). For this, the BS 112 implements scheduling functionality.

The UE 101 may be one of the following: a smartphone; a cellular phone; a table; a notebook; a computer; a smart TV; an MTC device; an eMTC device; an IoT device; an NB-IoT device; a sensor; an actuator; a non-IOT UE; an IOT UE; etc.

Figure 2:
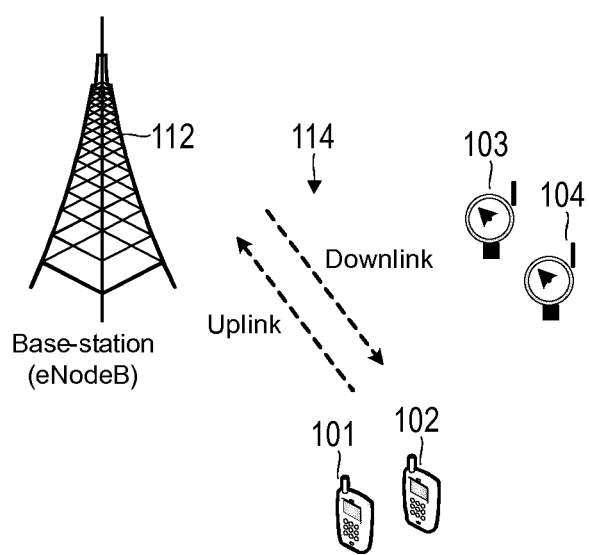
FIG. 2 schematically illustrates a network including a wireless link between a BS and IOT UEs as well as non-IOT UEs according to various examples.

FIG. 2 schematically illustrates aspects with respect to the wireless communication network 100. Here, different types of UEs 101-104 are connected to the BS 112. For example, non-IOT UEs 101, 102 are connected to the BS 112. Also, IOT UEs 103, 104 are connected to the BS 112.

Typically, the receiver bandwidth of the IOT 103, 104 is smaller than the receiver bandwidth of the non-IOT UEs 101, 102. Therefore, the IOT UEs 103, 104 communicate on a subband of the carrier supported by the BS 112; while the non-IOT UEs 101, 102 can communicate across the entire bandwidth of a carrier supported by the BS 112.

Typically, IOT UEs 103, 104 and non-IOT UEs 101, 102 are scheduled using scheduling information of different format. For example, different groupings of PRBs into RBGs may be employed for the IOT UEs 103, 104 and the non-IOT UEs 101, 102.

Figure 3:
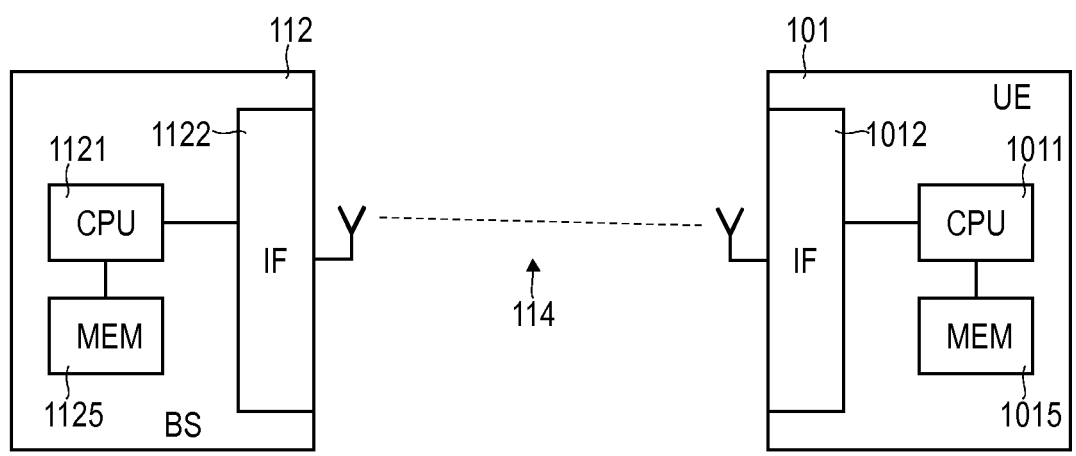
FIG. 3 schematically illustrates the BS and the UEs in further detail according to various examples.

FIG. 3 schematically illustrates the BS 112 and the UE 101 in greater detail.

The BS 112 includes a processor (CPU) 1121 and an interface (IF) 1122, sometimes also referred to as frontend. The IF 1122 includes a receiver and a transmitter. The BS 112 further includes a memory (MEM) 1125, e.g., a non-volatile memory. The memory may store program code that can be executed by the processor 1121. Thus, the processor 1121 and the memory 1125 form a control circuitry. Executing the program code may cause the processor 1121 to perform techniques with respect to: scheduling multiple UEs 101-104 on the wireless link 114; implementing transmission on a subband of a carrier; implementing transmission on a carrier; puncturing a transmission; etc.

The UE 101 includes a CPU 1011 and an IF 1012, sometimes also referred to as frontend. The IF 1012 includes a receiver and a transmitter. The UE 101 further includes a MEM 1015, e.g., a non-volatile memory. The memory 1015 may store program code that can be executed by the processor 1011. Thus, the processor 1011 and the memory 1015 form a control circuitry. Executing the program code may cause the processor 1011 to perform techniques with respect to: receiving scheduling information for a transmission on the wireless link 114; implementing the transmission on a subband of a carrier; implementing the transmission on the carrier;

blocking a transmission; etc.

While in FIG. 3 the UE 101 is shown for illustrative purpose, a similar configuration may be provided for the UE 102-104. For example, the capability of the interface 1012 of the UEs 103, 104 may be limited if compared to the capability of the interface 1012 of the UEs 101, 102, e.g., in terms of transmission bandwidth, etc.

Figure 4:
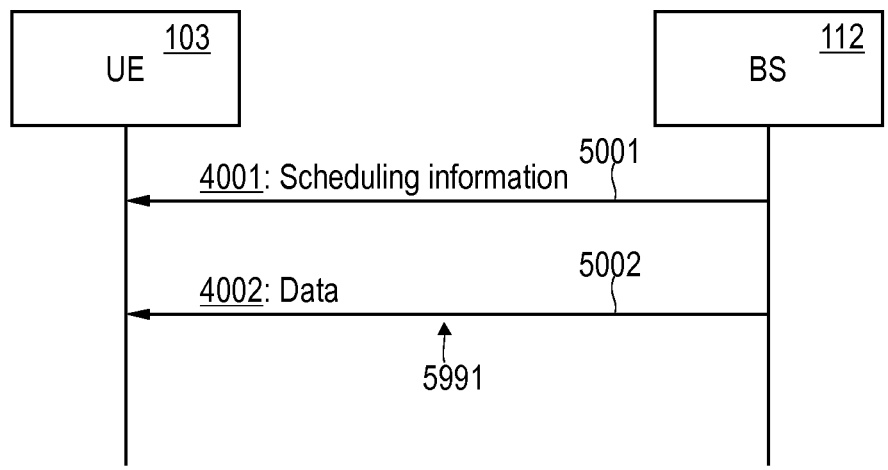
FIG. 4 is a signaling diagram of communicating scheduling information for a DL transmission on a plurality of PRBs according to various examples.

FIG. 4 schematically illustrates aspects with respect to communicating scheduling information 4001. The scheduling information 4001 is transmitted, at 5001, by the BS 112 and received by the UE 103. The scheduling information 4001 is for a transmission 5991 on a plurality of PRBs. As such, the scheduling information 4001 can be according to a predefined format which maps one or more indicators included in the scheduling information 4001—e.g., a scheduling bitmap—with the plurality of PRBs. For example, a DCI can be used.

The scheduling information 4001, in the scenario of FIG. 4 is for a DL transmission 5991 of data 4002 at 5002, e.g., application data or higher-layer control data.

For example, the DL transmission 5991 can be on a physical DL shared channel (PDSCH).

The DL transmission 5991 can include multiple repetitions of data, i.e., according to a CE technique (not illustrated in FIG. 4).

Figure 5:
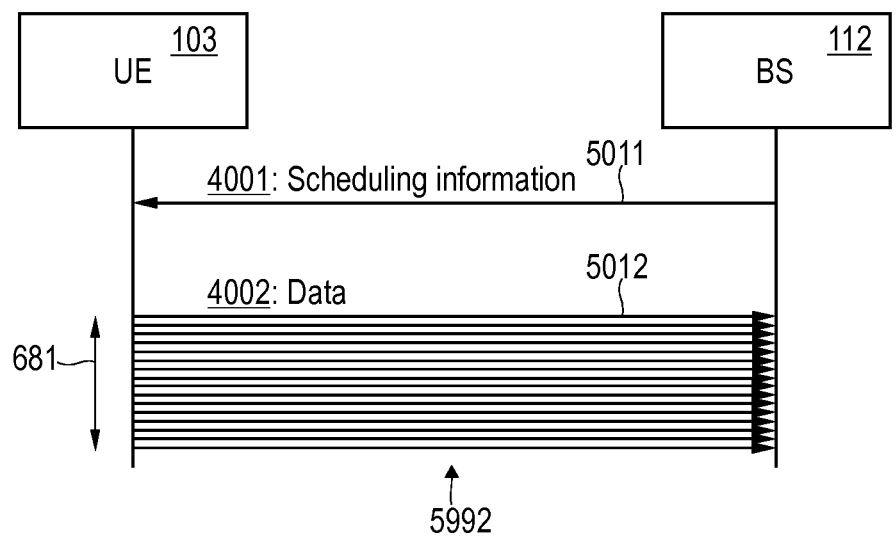
FIG. 5 is a signaling diagram of communicating scheduling information for a UL transmission on a plurality of PRBs according to various examples, wherein the UL transmission includes multiple repetitions of data according to a CE technique.

The scheduling information 4001 could also be for UL transmission of data, cf. FIG. 5.

FIG. 5 schematically illustrates aspects with respect to communicating scheduling information 4001. The scheduling information 4001 is transmitted, at 5011, by the BS 112 and received by the UE 103. The scheduling information 4001 is for a transmission 5092 on a plurality of PRBs. As such, the scheduling information 4001 can be according to a predefined format which maps one or more indicators included in the scheduling information 4001—e.g., a scheduling bitmap—with the plurality of PRBs.

For example, the scheduling information 4001 can be transmitted on a physical DL control channel (PDCCH).

The scheduling information 4001, in the scenario of FIG. 5 is for an UL transmission 5992 of data 4002 at 5012, e.g., of application data or higher-layer control data.

For example, the UL transmission 5992 can be on a physical UL shared channel (PUSCH).

For example, the UL transmission 5992 can include multiple repetitions of data, i.e., according to a CE technique (indicated by the multiple arrows in FIG. 5). The count of repetitions can be determined based on a CE level. The CE level may define a baseline count. The CE level also correlates with a time duration 681 required to complete the UL transmission 5992.

As will be appreciated from the illustration of FIG. 5, the transmission of IOT traffic relying on a large CE level can occupy the wireless link 114 for a significant transmission time duration 681. This also applies to transmissions of other types of traffic, including, but not limited to: enhanced Mobile Broadband (eMBB) and Ultra Reliable Low Latency Communication (URLLC), see 3GPP Technical Report (TR) 38.912 ver. 14.1.0, TR 38.913 ver. 14.1.0. URLLC may also rely on multiple repetitions of signals to enhance coverage, similar to the CE technique.

Hereinafter, strategies are described which facilitate fair access to the wireless link 114 for, both, transmissions associated with IOT traffic—typically associated with a long channel occupancy associated with the transmission time duration 681—and transmissions associated with non-IOT traffic.

Figure 6:
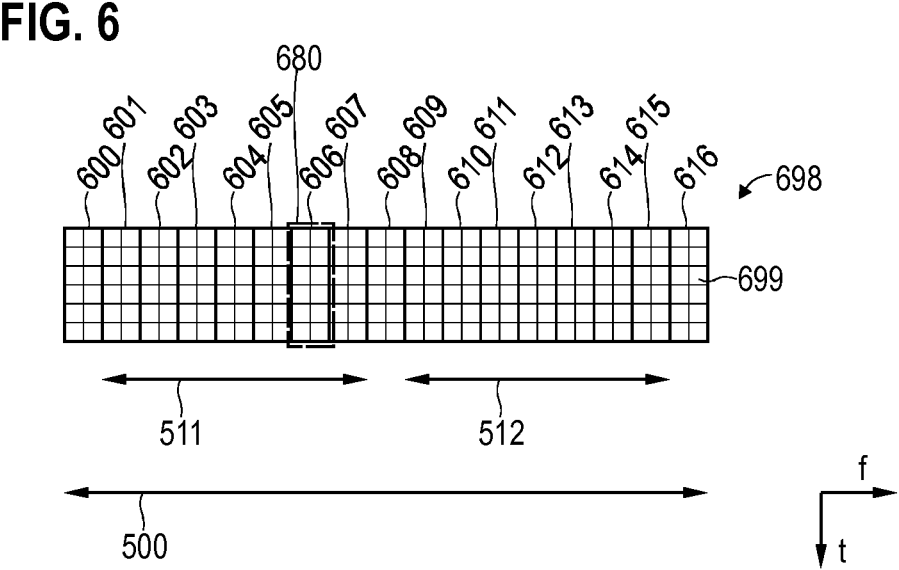
FIG. 6 schematically illustrates a time-frequency resource grid including PREs, PRBs and subband is according to various examples.

FIG. 6 schematically illustrates aspects with respect to a time-frequency resource grid 698. The time-frequency resource grid 698 is defined across the bandwidth of a carrier 500. The carrier includes multiple subcarriers, e.g., according to OFDM modulation. Symbols are defined in time domain. The symbols and subcarriers define PREs 699, as atomic units that can encode data.

Multiple PREs 699 are collected into PRBs 600-616. Each PRB 600-616 hence includes multiple REs 699 (in the non-limiting example of FIG. 6 there are 2×6=12 REs per PRB. For example, for 3GPP LTE, a PRB consists of 12 subcarriers in the frequency dimension and 7 OFDM symbols in the time dimension.

Typically, the time-frequency resource grid 698 is structured into transmission frames and subframes. Each subframe has a certain duration, e.g., 1 ms. Each subframe includes a certain count of PRBs 600-616 (in FIG. 6, only a single instance of PRBs 600-616 is illustrated in time domain for sake of simplicity).

To facilitate low-overhead scheduling, depending on the format of the scheduling information 4001, multiple PRBs 600-616 are collected into a RBG. Then, the RBG is the atomic unit that can be individually scheduled.

According to examples, a plurality of PRBs are scheduled for a transmission 5991, 5992. Hence, scheduling information 4001 for a transmission 5991, 5992 on the plurality of PRBs is communicated. For example, the scheduling information 4001 may be indicative of one or more RBGs.

For example, in the scenario of FIG. 6, scheduling information for transmission on the PRBs 601-607 in a narrowband 511 for IOT UEs 103, 104 may be communicated. For example, in MTC CE mode B, for the narrowband 511, 4 PRBs or 6 PRBs may be scheduled collectively.

Then, based on control information, even though the scheduling information covers the PRBs 601-607 of the narrowband 511, the transmission may be blocked for one or more forbidden PRBs 680 (dashed line in FIG. 6; in FIG. 6 the PRB 606 is a forbidden PRB 680).

Relying on the forbidden PRBs 680 helps to provide for flexibility in (I) the format of the scheduling information—which may rely on clustering into RBGs of different granularity for IOT UEs 103, 104 and non-IOT UEs 101, 102—and (II) resource-efficient coexistence of non-IOT UEs 101, 102 and IOT UEs 103, 104 on the carrier 500.

Specifically, the one or more forbidden PRBs 680 may facilitate puncturing of the respective transmission 5991, 5992 at the BS 112. In detail, it would be possible that the transmission 5991, 5992 scheduled for the IOT UE 103, 104 is punctured at the forbidden PRB 680; the forbidden PRB 680 can then be used for a further transmission 5991, 5992 between the BS 112 and a further UE 101, 102.

These findings are explained in greater detail hereinafter with respect to some example implementations.

For example, eMTC—e.g., used for the IOT UEs 103, 104—operates in a small bandwidth of 6 PRBs (72×15 kHz subcarriers or 1.4 MHz. Here, 72×15=1.08 MHz and some extra bandwidth is required for filtering, signal roll-off etc., leading to an overall signal bandwidth of 1.4 MHz. The 6 PRBs form a subband (also known as narrowband) for eMTC. For example, the subbands 511 and 512 are illustrated in FIG. 6. The subbands 511, 512 have a smaller bandwidth if compared to the 20 MHz bandwidth of an LTE non-IOT carrier 500. This smaller bandwidth reduces the complexity of the RF front end of the UE 103, 104 and hence reduces its cost.

The LTE carrier 500 is therefore divided into multiple non-overlapping subbands 511, 512 for eMTC operations. The LTE system bandwidths of the carrier 500 are 1.4 MHz, 3 MHz, 5 MHz, 10 MHz, 15 MHz and 20 MHz which contain 6, 15, 25, 50, 75 and 100 PRBs in the frequency domain respectively.

With the exception of 1.4 MHz, the total number of PRBs in a system bandwidth often cannot be divided equally into subbands that consist of 6 PRBs. The remaining PRBs are distributed such that the top and bottom parts of the system bandwidth of the carrier 500 contain equal numbers of PRBs and if there is an odd number of remaining PRBs, one PRB is placed in the middle of the system bandwidth. For example, a 15 PRB system bandwidth (3 MHz) can fit two full subbands leaving 3 PRBs 600, 608, 616 unused as shown in FIG. 6. For these remaining PRBs 600, 608, 616, one unused PRB 600, 616 is put in both ends of the system bandwidth and the remaining PRB 608 is inserted in the middle of the system bandwidth. The PRBs 601-607 are allocated to the subband 511; and the PRBs 609-615 are allocated to the subband 512.

In LTE, the scheduling information for a DL transmission often uses a resource allocation format 0. Here, the system bandwidth of the carrier 500 is divided into RBGs, where each RBG consists of NRB PRBs. An RBG is the granularity of resource allocation for PDSCH/PUSCH, that is the DL/UL resources are allocated in number of RBGs for a UE. The value NRB is dependent upon the system bandwidth and is summarized in Table 1.

TABLE 1

| System Bandwidth | | |
|---|---|---|
| MHz | Number of PRB | RBG size ($N_{RB}$) |
| 1.4 MHz | 6 | 1 |
| 3 MHz | 15 | 2 |
| 5 MHz | 25 | 2 |
| 10 MHz | 50 | 3 |
| 15 MHz | 75 | 4 |
| 20 MHz | 100 | 4 |

Figure 7:
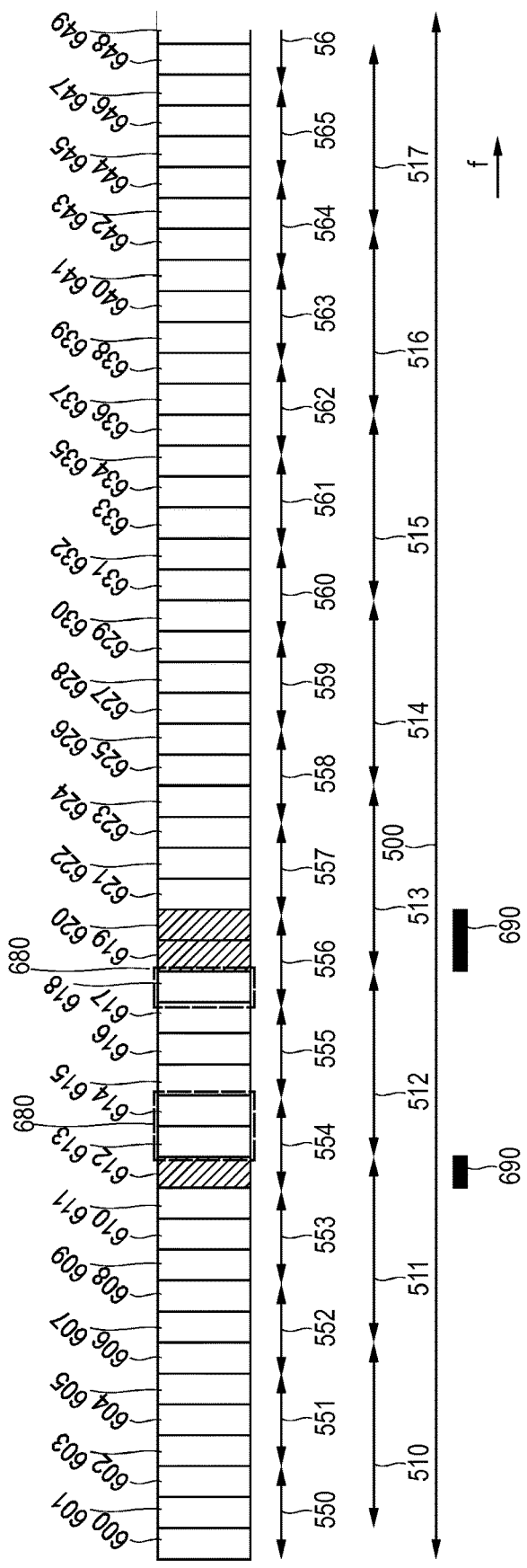
FIG. 7 schematically illustrates a time-frequency resource grid including PREs, PRBs, and subbands according to various examples.

An example is shown in FIG. 7 for a 10 MHz carrier 500 including 50 PRBs 600-649. Here the 50 PRBs 600-649 are divided into 17 RBGs 550-566, where 16 of these RBGs 550-565 are 3 PRBs wide, for example RBG 556 consists of PRB 618, 619, 620. The last RBG 566 is 2 PRBs wide, PRBs 648, 649.

In 3GPP R1-1720541, it is observed that the RBG in the LTE band defined across the carrier 500 and the subbands 510-517 of eMTC are not aligned. For example, in FIG. 7, the subbands 510-517 are arranged in the bandwidth of the carrier 500 such that they are centered with the two unused PRBs 600, 649 placed at both edges of the carrier 500. It can be observed that the RBGs 550-566 and subbands 510-517 are not PRB aligned, i.e. they do not start from the same PRB 600-649.

A consequence of this misalignment between RBG 550-566 and the subbands 510-517 is that in a system that supports both LTE and eMTC—or, generally, transmissions of IOT traffic and non-IOT traffic which is scheduled differently, e.g., using different formats of the scheduling information—RBGs 550-556 that overlap with a used subband 510-517 cannot be scheduled for the non-IOT UEs 101, 102.

This is illustrated in FIG. 7. Here, subband 513 is scheduled and is allocated to PRBs 619-624. As described previously, RBG is the smallest granularity for PDSCH scheduling of the non-IOT UEs 101, 102 and it can be observed that since PRBs 619, 620 are used for the subband 513 for scheduling IOT UEs 103, 104, RBG 556—including these PRBs 619, 620—cannot be used for scheduling non-IOT UEs 101, 102; thus, PRB 618 cannot be used by non-IOT UEs 101, 102. Similarly, PRB 624 is occupied by the subband 513 which prevents the usage of RBG 558—despite the majority of RBG 558 PRBs—PRBs 625, 626—being outside the subband 513. This leads to degradation in the cell throughput/spectral efficiency for the LTE system.

3GPP LTE MTC rel.15 scope has been updated to include the support for more flexible starting PRB for PDSCH/PUSCH resource allocation in connected mode at least for UE operating in CE mode NB configured with 1.4 MHz max MTC channel bandwidth. See 3GPP RP-172811.

Hereinafter, techniques are described which facilitate reducing unused PRBs, specifically in the aforementioned configurations. Thus, spectral utilization can be high when employing the techniques described herein.

For illustrative purposes, it is assumed that the IOT UE 103 is allocated to use subband 512. Due to the need of extended coverage operation, that IOT UE 103 has also been allocated to transmit with N-times repetitions, i.e., CE technique with a CE level of N. There are also other non-IOT UEs 101, 102 in the cell scheduled by the same BS 112 that can use any PRBs 600-649, provided those PRBs are allocated in units of RBG, including for example RBG 554, 555, 556.

In conventional scenarios, the non-IOT UEs 101, 102 would be prevented from using PRBs 612, 619, 620, because they are part of a RBG 554, 556 which have some overlap with the subband 512. For example, the PRBs 619, 620 cannot be individually addressed without the PRB 618, because all PRBs 618-620 are part of the collective RBG 556. Thus, any scheduling of a non-IOT UE 101, 102 using scheduling information indicative of allocation of the RBG 556 would lead to potential collision with the IOT UE 103 on the PRB 618.

To avoid this, control information on forbidden PRBs 680 is used. The IOT UE 103 scheduled on the subband 512 blocks transmission on the forbidden PRBs 680. In the example of FIG. 7, the forbidden PRBs 680 are the PRBs 613, 614 and 618.

Because the IOT UE 103 blocks the transmission on the forbidden PRBs 680, the RBGs 554, 556 can be safely used for scheduling any non-IOT UE 101, 102. Thus, the transmission between the BS 112 and the IOT UE 103 is punctured by means of the forbidden PRBs 680; the forbidden PRBs 680 are used for scheduling a further transmission between the BS 112 and one or more non-IOT UEs 101, 102.

As a general rule, there are different options available for blocking the transmission on any forbidden PRBs 680. In one example, the respective UE 103-104 may refrain from using such forbidden PRBs 680, even though scheduling information was received schedules a plurality of PRBs—e.g., a RBG—including one or more forbidden PRBs 680. For example, respective data—otherwise allocated to a forbidden PRB—may be redistributed to a non-forbidden PRB. This may include extending the transmission in time domain and/or frequency domain. In one example, blocking can include suspending the transmission in accordance with any forbidden PRBs 680. When blocking, transmitting and/or receiving on any forbidden PRBs 680 may be paused. For example, a transmission buffer—e.g., an HARQ buffer—may be persevered and maintained, and may not be flushed. Then, the transmission can be resumed once blocking is deactivated. The scheduling information 4001 is for a plurality of PRBs which include one or more forbidden PRBs. For example, the scheduling information 4001 may collectively allocate the plurality of PRBs to the respective UE 103-104. Then, by means of the control information the allocation on the one or more forbidden PRBs 680 may be overridden, as part of said blocking.

As a general rule, the control information may specify whether blocking is to be implemented by suspending and resuming the transmission, including maintaining the transmission buffer; or by re-starting the transmission. Re-starting the transmission may include terminating the transmission which may include flushing the transmission buffer, re-initializing counters and/or timers, e.g., of a HARQ protocol, etc. . . . For example, the selection between (I) suspending and resuming and (II) re-starting the transmission may be based on a latency of the associated traffic. There may be a tendency to select re-starting the transmission for low-latency traffic. For example, the network may provide DL control signaling to instruct the selection between (I) suspending and resuming; and (II) re-starting the transmission. In other scenarios, this selection may be taken by the UE. There may also be a negotiation of this selection between UE and network.

In some examples, one or more forbidden PRBs 680 may be fixedly configured at the respective UE 103-104. In further examples, the BS indicates one or more forbidden PRBs 680 to the UE 103-104. The respective UE 103-104 may receive a DL configuration control message indicative of the control information on the one or more forbidden PRBs 680. The DL configuration control message may be transmitted by the respective BS 112 scheduling. The DL configuration control message can enable to the BS 112 to puncture the respective transmission, to thereby accommodate for a further transmission. Thus, the DL control information may be referred to as pre-emption indication. The DL configuration control message helps to align puncturing of the transmission at the BS.

For example, the DL configuration control message may be an RRC control message. The DL configuration control message may be communicated separately from the scheduling information. Such indication of the control information can be explicit or implicit. For example, the respective UE 103-104 can be informed that blocking functionality is to be applied and the UE 103-104 then understands that any PRBs 600-649 within a subband 550-566 that are part of an RBG 510-517 that partially overlaps the subband 510-517 are invalid. For example, if the IOT UE 103 is allocated on subband 512, the UE 103 can determine that PRBs 613, 614, 618 are forbidden PRBs 680.

Hence, where the transmission is on a subband 510-517 of the carrier 500, the one or more forbidden PRBs 680 can be associated with a RBG 550-556 which has an overlap with a part of the carrier 500 that is outside the subband 510-517 (in FIG. 7, the overlap 690 is illustrated for the RBGs 554, 556 associated with the subband 512). Thus, the overlap 690 affects a further transmission which is across the carrier 500.

Here, it is not mandatory that scheduling information is used for scheduling on the subbands 510-517 which has a format that also relies on the same RBGs 550-556 that are used by the scheduling information used for scheduling on the carrier 500.

As a general rule, different criteria can be applied to conclude from an overlap 690 on which PRB(s) are to be implemented as forbidden PRB(s) 680. For example, if there is an overlap 690 for a RBG 550-556, then any PRBs 600-649 of the respective RBG 550-556 may be blocked.

In some examples, the transmission may be blocked fully or partly if the overlap 690 is larger than a predefined threshold. For example, the threshold may be 50%. In the example of FIG. 7, the overlap 690 for the RBG 554 is ⅓=33%; hence, below the threshold. Then, the PRBs 613, 614 of the RBG 554 may not be blocked. Differently, the overlap 690 for the RBG 556 is ⅔=66%; hence, above the threshold. Then, the PRB 618 of the RBG 556 may be blocked. By relying on the threshold comparison, a fair balance between transmissions of IOT traffic and non-IOT traffic can be achieved.

The threshold may be indicated in DL control signaling or may be fixedly set.

The BS 112 can also indicate additional resources to compensate for any forbidden PRB 680. This is illustrated in FIG. 8.

Figure 8:
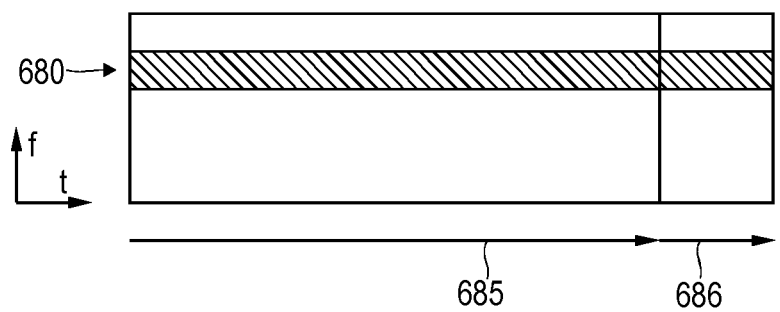
FIG. 8 schematically illustrates blocking of a transmission on at least one forbidden PRB according to various examples.

FIG. 8 schematically illustrates allocated resources as a function of time for a transmission 5991, 5992. In FIG. 8 it is illustrated that forbidden PRBs 680 are defined. Thus, to compensate for the resources lacking due to the forbidden PRBs 680, the baseline time duration 685 for which resources are scheduled is extended by an extension time duration 686. For example, the baseline time duration 685 can correspond to the transmission time duration 681 in a conventional scenario. The extension time duration 686 can be considered by the scheduler at the BS 112. The extension time duration 686 extends the duration of the transmission 5991, 5992.

The extension time duration 686 may be explicitly or implicitly indicated in the scheduling information 4001; in some examples, it would also be possible that the extension time duration 686 is not indicated by the scheduling information 4001, but rather derived by the BS 112 and the scheduled UE 101-104 from the control information used for determining the one or more forbidden PRBs 680. For example, the extension time duration 686 can be determined based on the count of forbidden PRBs 680. Then, the extension time duration 686 can extend the baseline time duration 685 that is defined by the scheduling information 4001.

For example, in a CE framework, the extension time duration 686 can be used to accommodate for additional repetitions of the signal. The additional repetitions can compensate for the reduced bandwidth due to the forbidden PRB(s) 680.

For example, where a CE technique is employed, the count of the multiple repetitions of the data can be determined depending on a count of the forbidden PRBs 680. Based on the repetition rate of the multiple repetitions, it is then possible to conclude back on the extension time period 686.

There may be a tendency that for a larger count of forbidden PRBs 680 the count of repetitions of the CE technique is increased. For example, a respective mapping may be indicated in a corresponding DL control signaling. The mapping may be between the count of the forbidden PRBs 680 and the count of the repetitions. The mapping can then be used to determine the count of repetitions.

In detail, a so-called "additional repetitions" factor can be defined. The additional repetitions factor may determine the extension count of repetitions—associated with the extension time duration 686—which are defined beyond a baseline count of repetitions—associated with the baseline time duration 685. Typically, the baseline count of repetitions is determined based on a signal quality of the transmission, e.g., a receive signal strength, a bit error rate, etc.

As a general rule, there are various approaches available as to how the IOT UE 103, 104 can determine the additional repetitions factor:

In one example, the additional repetitions factor is predefined, e.g., hardcoded according to a ruleset. The IOT UE 103, 104 may then determine which additional repetitions factor to apply based on either: (I) There is a mapping between the number of forbidden PRBs 680 and the additional repetition factor; and/or (II) the IOT UE 103, 104 is signaled an index of the additional repetitions factor to apply, e.g., in the DCI that schedules the IOT UE 103, 104 with the subband 510-517 that is afflicted with the forbidden PRBs 680. The IOT UE 103, 104 can determine these additional repetitions by taking into account the percentage of forbidden PRBs 780. For example, an IOT UE 103, 104 is allocated 6 PRBs and 32 repetitions (baseline count). The BS 112 signals that one PRB—out of the 6 PRBs—is a forbidden PRB 680. e.g., from RRC DL control signaling or DCI. Then, the IOT UE 103, 104 can determine the additional repetition factor as [⅙×32]=6. That is, the IOT UE 103, 104 extends its repetition from 32 (baseline count) to 38 using an extended count of 6 to compensate for the resources that were lost due to the forbidden PRB 680.

The above information can be signaled to the IOT UE 103, 104 via DCI or high-layer control signaling, e.g., RRC.

Figure 9:
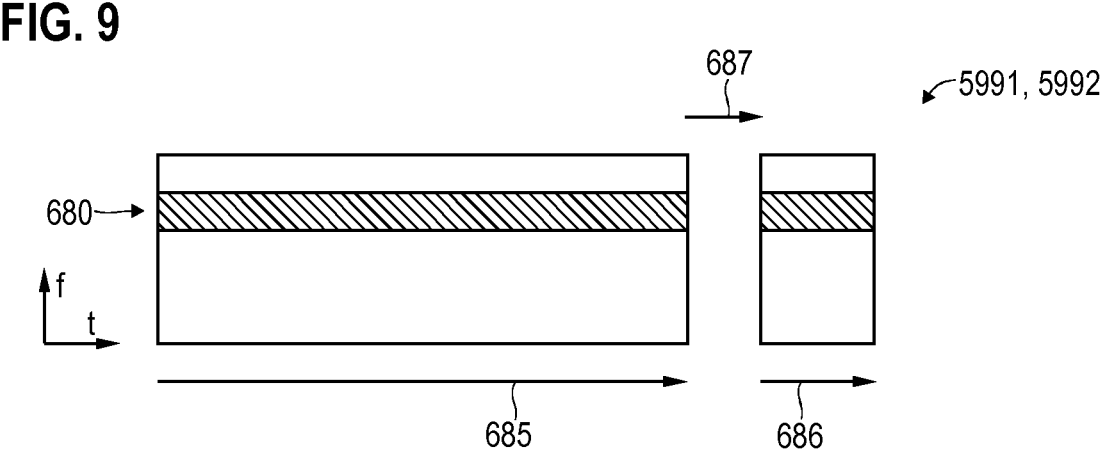
FIG. 9 schematically illustrates blocking of a transmission on at least one forbidden PRB according to various examples.

In FIG. 8, the additional resources in the extension time duration 686 are directly adjacent to the original resources. In FIG. 9, there is a gap 687 between the baseline time duration 685 and the extension time duration 686. For example, the legacy N repetitions of the data and the extension repetitions are separated by the gap 687. In the various examples described herein, such a gap 687 may be employed or not employed.

In the examples of FIGS. 8 and 9, the blocking 680 is activated throughout the transmission 5991, 5992. As a general rule, the blocking can be statically activated; the blocking, alternatively, could be dynamically activated and deactivated.

In one example, at least one DL activation control message may be communicated, i.e., transmitted by the BS 112 and/or received by the respective UE 101-104. Blocking may be activated and/or deactivated depending on the at least one DL activation control message.

In one example, the DL activation control message may be indicative of a time duration during which said blocking is activated and/or deactivated. Hence, the puncturing of the transmission 5991, 5992 at the BS 112 can be in accordance with the DL activation control message.

The DL activation control message may be generally communicated prior or after commencing the transmission 5991, 5992 to be partly blocked and punctured. For example, the transmission 5991, 5992 may commence and then, after commencing, the DL activation control message can be communicated.

In one example, the BS 112 may indicate which portion of the CE repetitions is to be blocked—e.g., sequence numbers associated with the CE repetitions may be indicated during which the blocking is activated. For example, sequence numbers of subframes of a transmission protocol used on the wireless link 114 may be indicated. Then, all CE repetitions hosted by these subframes may be blocked.

Figure 10:
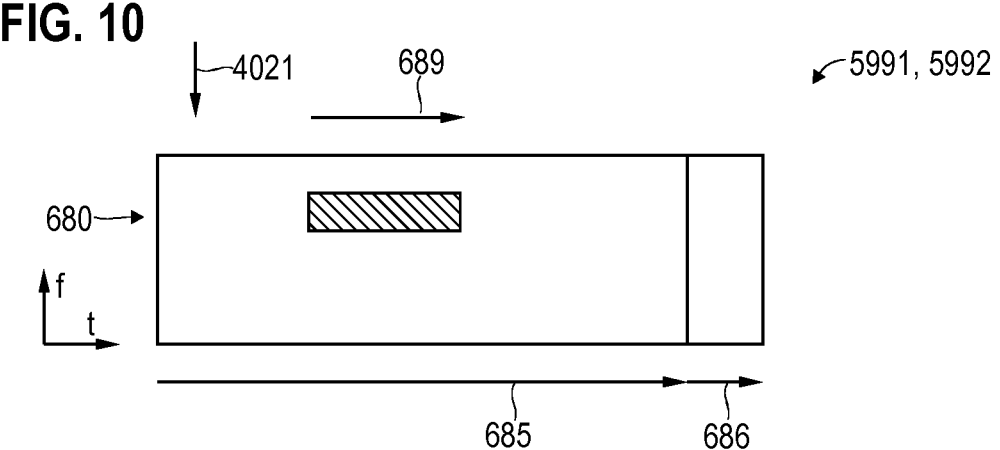
FIG. 10 schematically illustrates blocking of a transmission on at least one forbidden PRB according to various examples.

For example in FIG. 10, an IOT UE 103, 104 is configured for N repetitions (CE level) of application data on the PUSCH. The DL activation control message 4021 is indicative of M subframes associated with a blocking time duration 689 for which blocking is to be activated on the forbidden PRBs 680; the blocking time duration 689 corresponds to a transmission gap. For example, each subframe of the respective transmission protocol may include one or more repetitions of the CE technique.

The IOT UE 103, 104 pauses its PUSCH transmission during these M subframes during the blocking time duration 689. The IOT UE 103, 103 then extends its repetition for the extension time duration 682 to compensate for the interrupted repetitions. In FIG. 10, the one or more forbidden PRBs 680 do not extend across the entire bandwidth allocate to the transmission 5991, 5992; e.g., the bandwidth allocated to the transmission 5991, 5992 may be defined by a respective subband 510-517 in an IOT scenario. In FIG. 10, hence, the transmission 5991, 5992 is partly blocked by the respective UE.

Figure 11:
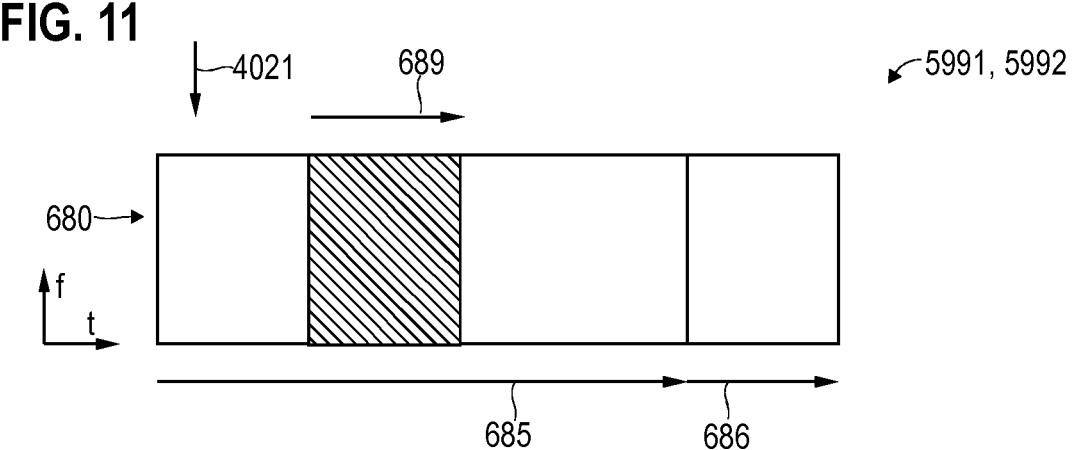
FIG. 11 schematically illustrates blocking of a transmission on at least one forbidden PRB according to various examples.

In FIG. 11 a scenario is illustrated for a larger amount of forbidden PRBs 680 where the entire transmission is interrupted. Here, the forbidden PRBs 680 cover the entire bandwidth of the transmission 5991, 5992. In FIG. 11, the transmission 5991, 5992 is hence fully blocked. As a general rule, in the various examples described herein, the transmission 5991, 5992 may be full or partly blocked.

Figure 12:
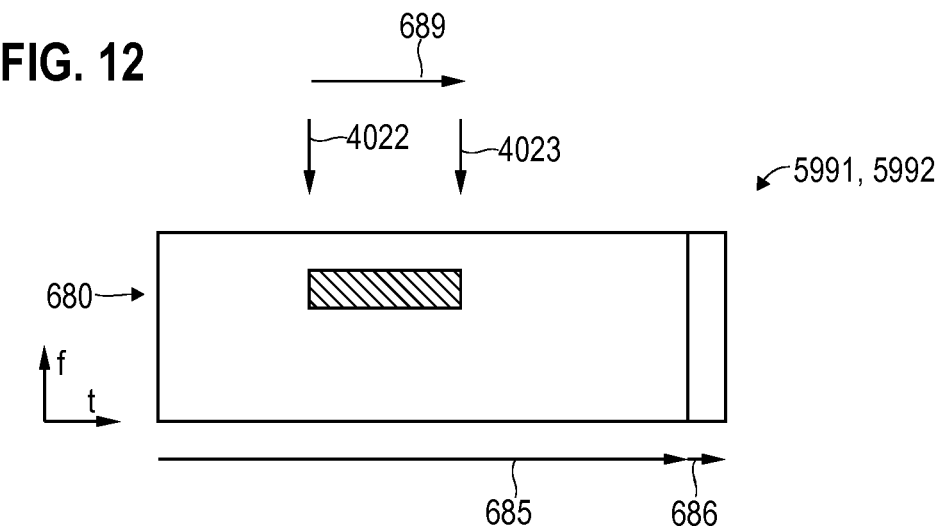
FIG. 12 schematically illustrates blocking of a transmission on at least one forbidden PRB according to various examples.

In the example of FIG. 12, two DL activation control messages 4022, 4023 are communicated from the BS 112 to the IOT UE 103, 104. The initial DL activation control message 4022 is indicative of activation of blocking. The subsequent DL activation control message 4023 is indicative of deactivation of blocking. This DL activation control message 4023 hence acts to resume the previous PUSCH transmission of the IOT UE 103, 104.

As a general rule, in the various examples described herein, it is not mandatory to resume the previous transmission. Rather, a selection between (I) resuming the transmission; and (II) re-starting the transmission may be made. This selection may be made by the UE and/or the network. For example, this selection may be instructed by the network; or may be negotiated between the UE and the network. In some examples, it would be possible that one or more DL activation control messages (e.g., in FIG. 12 the DL activation control message 4022 and/or the DL activation control message 4023; or DL activation control message 4021 in FIGS. 10 and 11, etc.) and/or one or more DL configuration control messages are used to indicate whether, after the blocking time duration 689, the previous transmission is to be resumed; or whether, after the blocking time duration 689, the previous transmission is not be resumed, but rather re-started. Such re-starting may include a termination of the transmission. The termination may include buffer flushing, re-initializing of a HARQ protocol be re-initializing one or more counters and/or timers, etc.

Figure 13:
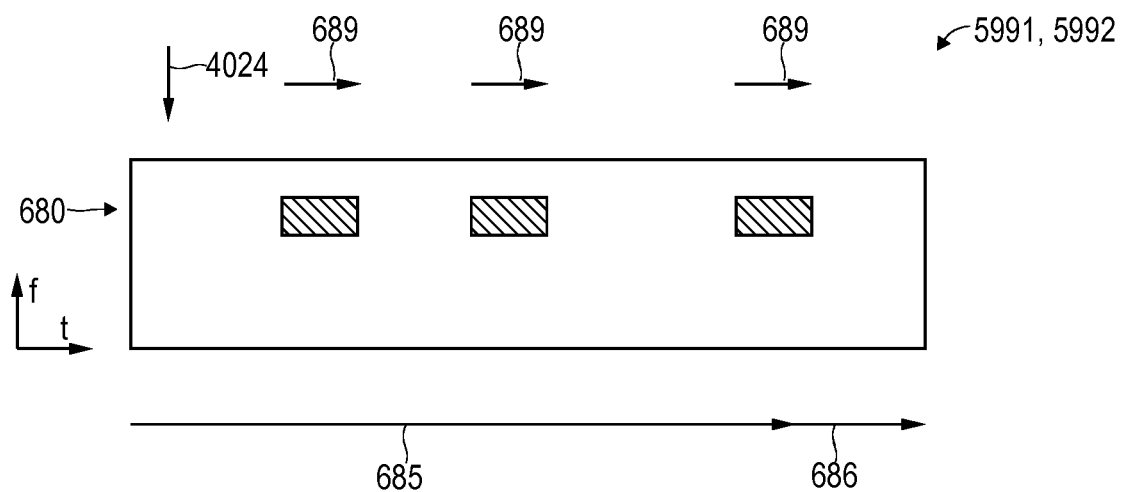
FIG. 13 schematically illustrates blocking of a transmission on at least one forbidden PRB according to various examples.

In the example of FIG. 13, the DL activation control message 4024 is indicative of a repetitive schedule of said activating and deactivating of said blocking. Hence, a discontinuous transmission (DTX) schedule can be implemented. By means of a single DL activation control message 4024, blocking can be activated and deactivated multiple times; thus, multiple blocking time durations 689 are defined. This gives the BS 112 flexibility to schedule data for non-IOT UEs 101, 102. Using the DTX schedule helps to puncture the transmission 5991, 5992 multiple times at the BS 112.

As a general rule, the DTX schedule may be periodic or non-periodic. The DTX schedule may include a repetition of ON durations and OFF durations. These repetitions may be arranged periodically or non-periodically, with variable periodicity, etc.

As used herein, the DTX schedule can be applied for puncturing an UL transmission and/or a DL transmission. The DTX schedule may affect receiving and/or transmitting. Sometimes, DTX in connection with receiving is referred to as discontinuous reception (DRX), which is a special form of DTX described herein.

In the examples of FIGS. 9-13, while activating said blocking during the blocking time durations 689, the IOT UE 103, 104 can terminate transmission—but may not flush its HARQ buffer. This enables the IOT UE 103, 104 to resume transmission when deactivating said blocking, e.g., after lapse of a blocking time duration 689 and/or upon receiving the DL activation control message 4023. In general terms, the transmission can be started, e.g., with deactivated blocking. The, when activating said blocking, the transmission is suspended on any forbidden PRB 680. Upon deactivating said blocking, the transmission on the forbidden PRB(s) 680 is resumed. The transmission buffer may be maintained between said suspending and said resuming. Data scheduled for transmission on any forbidden PRB 680 may thereby be kept in the transmission buffer. This facilitates low-latency transmission.

This is explained in connection with FIG. 14. For example, the IOT UE 103 is given an UL grant to transmit a PUSCH with N repetitions—which corresponds to the baseline time duration 685. During its transmission, the BS 112 indicates using the DL activation control message 4022—e.g., implemented using a DCI—that the IOT UE 103 should suspend the transmission, but not flush its HARQ buffer after K repetitions. The BS 112 may then schedules other non-IOT UEs 101, 102 for M maximum transmissions duration time. After some time, the MTC UE receives DL activation control message 4023 which tells the IOT UE 103 to resume its previous PUSCH transmission using L repetitions. The value L can be N-K, but this need not be the case since typically repetitions in CE are assigned in powers of twos {2, 4, 8, 16, 32, 64, etc}. It should also be appreciated that the BS 112 can also send a DCI for a new PUSCH transmission instead of resuming the previous transmission, which also implicitly indicates to the UE to flush its pervious PUSCH HARQ buffer.

Figure 14:
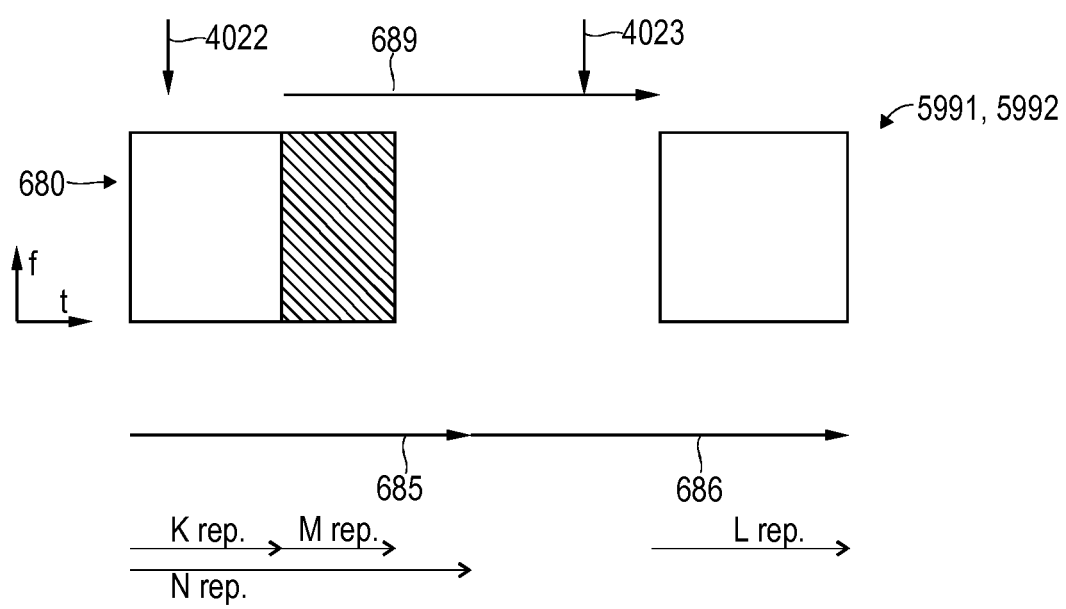
FIG. 14 schematically illustrates blocking of a transmission on at least one forbidden PRB according to various examples.

As will be appreciated from the example of FIG. 14, generally,—where the transmission 5991, 5992 includes multiple repetitions—the blocking using the one or more forbidden PRBs 680 may occur in-between the multiple repetitions.

Figure 15:
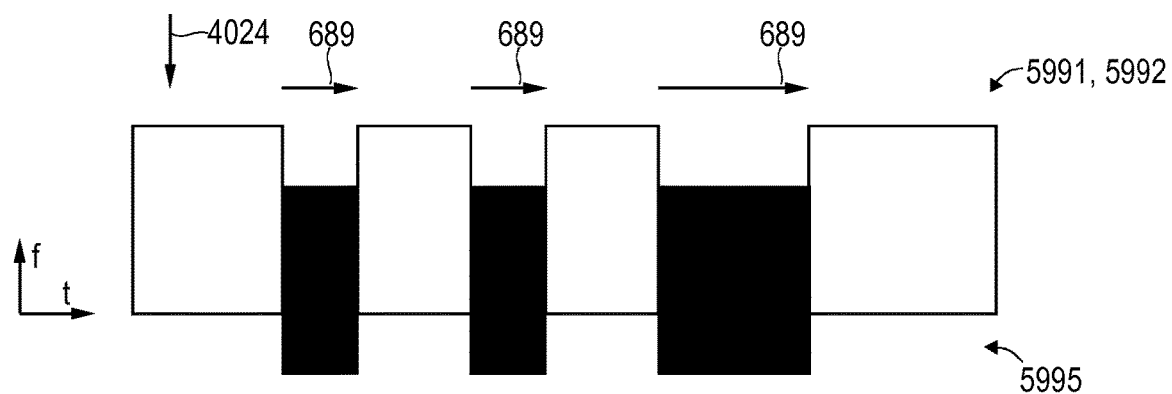
FIG. 15 schematically illustrates puncturing a first transmission and scheduling a second transmission in accordance with said puncturing and according to various examples.
Figure 16:
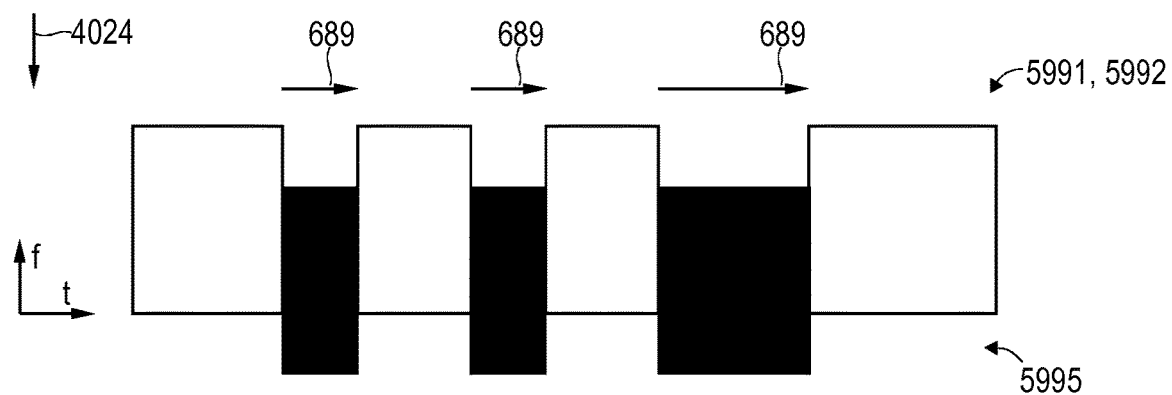
FIG. 16 schematically illustrates puncturing a first transmission and scheduling a second transmission in accordance with said puncturing and according to various examples.

FIGS. 15 and 16 illustrate details of scheduling a first transmission 5991, 5992 and scheduling a second transmission 5995 (filled areas in FIGS. 15 and 16) in accordance with a DTX schedule. The first transmission is punctured by means of the DTX schedule defining the blocking time intervals 689.

For example, the transmission 5991, 5992 may be for N repetitions on PDSCH or PUSCH. Gaps of length $M_k$, for the k-th gap, are used for puncturing the PDSCH/PUSCH transmission 5991, 5992. Here, a targeted repetition of N is scheduled by using respective scheduling information transmitted to the UE 103, 104; by overriding the scheduling information in accordance with the control information indicated by the DL configuration control message 4024, the UE 103, 104 uses the DTX schedule to repeatedly block the transmission 5991, 5992. This results in the extension duration 682. The extension duration 682 can be larger than the sum of all blocking durations 689.

This allows the BS 112 to puncture the transmission 5991, 5992 by scheduling another transmission 5995 within the blocking time durations 689.

Such techniques are not restricted to a specific kind and type of transmission 5991, 5992, 5995. For example, eMTC using CE may be used for the transmission 5991, 5992, but generally various use cases are conceivable where two or more transmission 5991, 5992 and 5995 of different durations need to share partially or fully their resources. An example of such transmission can be found in NR where a long transmission such as eMBB is pre-empted by a shorter transmission such as URLLC where the transmission cannot tolerate any latency and needs to be very reliable. During the blocking time durations 689, the BS 112 can schedule a legacy LTE RB or in the NR scenario, the gNB can schedule URLLC during the gaps in an eMBB transmission.

The DTX schedule can be RRC configured, using the DL configuration control message. Blocking, in accordance with the DTX schedule and at the respective UE 101-104, can be activated and deactivated in accordance with the DL activation control message, e.g., implemented using DCI. Hence, the respective UE 103-104 can be firstly RRC configured with a DTX schedule, but the respective UE 103-104 will not use this DTX schedule for blocking transmission, unless indicated by the DL activation control message 4024. This DL activation control message 4024 can occur prior to the transmission 5991, 5992 as shown in FIG. 15, e.g., in the form of an UL/DL grant. Alternatively, the DL activation control message can occur during the transmission 5991, 5992 as shown in FIG. 16, e.g., in the form of an pre-emption indicator.

The DTX schedule can be configured only for a subset of frequency and time resources, or generally PRBs. That is, the UE 103, 104 will only activate blocking the transmission 5991, 5992 in accordance with the DTX schedule for a certain time duration, until a temporal validity of the DTX expires. This is beneficial for example if a corresponding subset of resources within the temporal validity is used for UL grant-free transmission. For example, the transmission 5995 can be UL grant-free transmission. In 3GPP NR, UL grant free transmission is typically used for URLLC; here, a UE 101, 102 can transmit a URLLC whenever it arrives without request for UL resources from the BS 112. Hence, if an eMBB transmission 5991, 5992 of the IOT UE 103, 104 overlaps these grant free resources either partially or fully, the IOT UE 103, 104 can block transmission in a accordance with the DTX schedule to facilitate co-scheduling of the UL grant-free transmission 5995.

A plurality of DTX schedules can be configured using the DL configuration control message. The DL configuration control message can be indicative of control information on multiple candidate DTX schedules. Each candidate DTX schedule may define different forbidden PRBs 680. Then, to activate a selected one of the plurality of candidate DTX schedules, the DL activation control message can be transmitted. The DL activation control message can be indicative of a selected one of the candidate DTX schedules and can activate blocking of the transmission on one or more forbidden PRBs 680 defined by the selected candidate DTX schedule. This activation can occur prior to or after commencing of the transmission.

Figure 17:
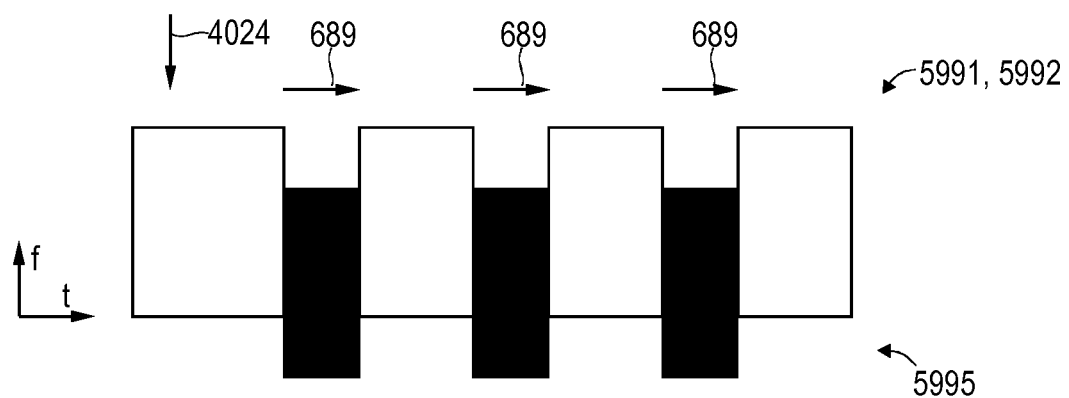
FIG. 17 schematically illustrates puncturing a first transmission and scheduling a second transmission in accordance with said puncturing and according to various examples.

As a general rule, the DTX schedule can be uniform, instead of the irregular pattern shown in FIGS. 15 and 16. The blocking durations 689 can be of equal lengths. A constant periodicity may be employed. An example is shown in FIG. 17, where the blocking time durations 689 are all of the same size and a fixed periodicity is employed. A uniform DTX pattern can be beneficial for the scheduler in scheduling LTE RBs or URLLC within the gaps of an existing transmission.

Figure 18:
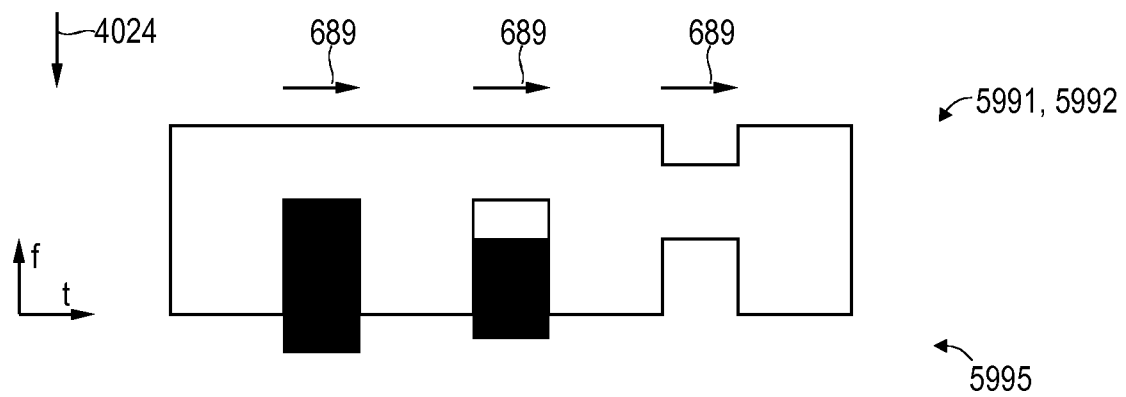
FIG. 18 schematically illustrates puncturing a first transmission and scheduling a second transmission in accordance with said puncturing and according to various examples.

The DTX schedule may define full or partial blocking. Thus, during the blocking time durations 680 not all PRBs of the transmission 5991, 5992 may be blocked, as shown in an example in FIG. 18. Here, the forbidden PRBs 680 may change from period to period of the DTX schedule. This is beneficial if the PDSCH/PUSCH transmission overlaps part of an LTE's RBG or in the eMBB case, it partially overlaps a grant free resource region.

Figure 19:
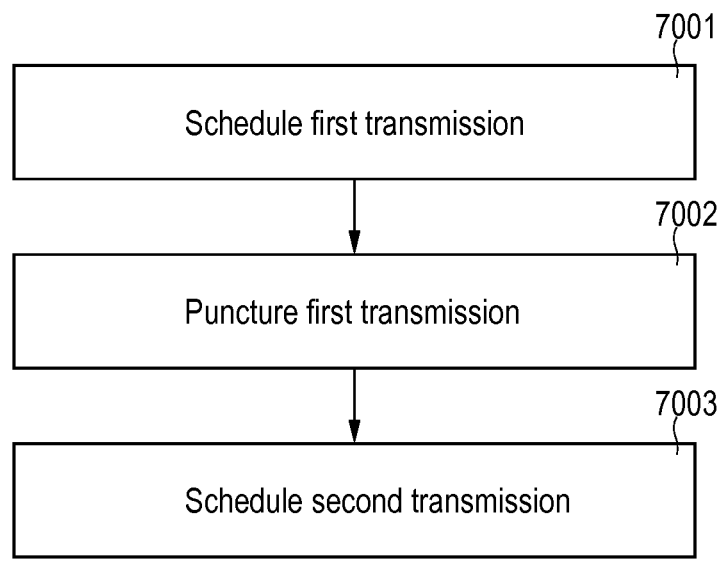
FIG. 19 is a flowchart of a method according to various examples.

FIG. 19 is a flowchart of a method according to various examples. For example, the method according to FIG. 19 may be executed by the control circuitry 1121, 1125 of the BS 112.

At block 7001, a first transmission is scheduled between the BS and a first UE. For example, the first transmission could be associated with IOT traffic. For example, the first transmission could be implemented according to the eMBB protocol, the URLLC protocol, and/or employ CE using multiple repetitions.

Scheduling the first transmission can include transmitting scheduling information for the first transmission. The scheduling information can be indicative of a plurality of PRBs allocated to the first transmission. Details of communicating scheduling information and allocation of PRBs, e.g., using a RBG, have been described in connection with FIGS. 4-6.

For example, the scheduling information may define a baseline time duration during which PRBs are allocated to the first transmission. The scheduling information may define a baseline count of repetitions for a transmission using CE.

Next, at block 7002, the first transmission is punctured. There are various options available for implementing said puncturing. In one example, the first transmission is punctured on at least one forbidden PRB. The at least one forbidden PRB is included in the plurality of PRBs allocated to the first transmission when scheduling the first transmission at block 7001. For example, the at least one PRB can be surrounded in time domain and/or frequency domain by non-forbidden PRBs allocated to the first transmission. The at least one PRB may define a blocking time duration during which the UE at least partly blocks the first transmission. Hence, the at least one forbidden PRB can be used otherwise. By relying of the at least one forbidden PRB, the scheduling information—which includes the forbidden PRB—can be overridden.

Specifically, at block 7003, a second transmission between the BS and a second terminal is scheduled on the at least one forbidden PRB. Thereby, the second transmission can be surrounded by the first transmission, in time domain and/or frequency domain. The first and second transmission can be arranged interleaved in time domain.

There are various options available to define the at least one forbidden PRB. For example, the puncturing could be in accordance with a DTX schedule which defines the at least one forbidden PRB. Such scenarios have been explained in connection with FIGS. 13, 15-18, 22. The at least one forbidden PRB could be set in accordance with control information. The control information may be determined based on an overlap of a PRB group with, both, a subband of a carrier and a part of the carrier which is outside of the subband. In such a scenario, there may be no need to explicitly signal a DL configuration control message which is indicative of the control information. In other scenarios, it would be possible to signal the DL configuration control message to synchronize the at least one forbidden PRB between the BS and the UE.

The puncturing may include activation of the blocking and deactivation of the blocking of the transmission on the at least one forbidden PRB. For this, a DL activation control message may be transmitted by the BS and may be received by the UE. Thereby, said puncturing may be time constrained. The DL activation control message can activate and deactivate the blocking of the transmission at the UE.

In some examples, the puncturing of the first transmission may be in response to detecting an overlap of the first transmission with the second transmission. The overlap may correspond to at least one PRB or PRE which is allocated to, both, the first transmission and the second transmission. This may be judged based on said scheduling of the first transmission and/or said scheduling of the second transmission.

Figure 20:
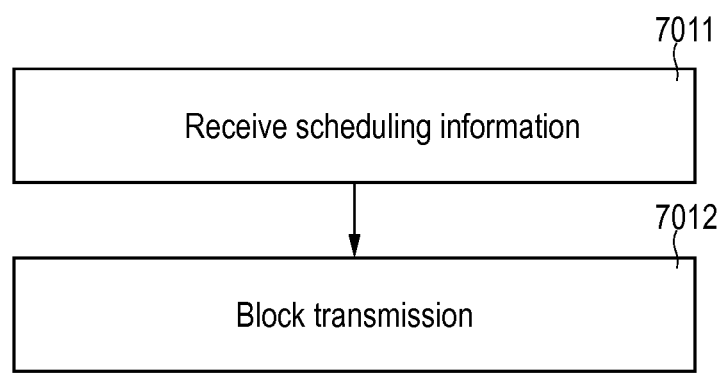
FIG. 20 is a flowchart of a method according to various examples.

FIG. 20 is a flowchart of a method according to various examples. For example, the method of FIG. 20 may be executed by the control circuitry 1011, 1015 of the UE 101-104.

At block 7011, scheduling information is received. As such, block 7011 can be inter-related to block 7001.

The scheduling information can be for a transmission on a plurality of PRBs. For example, the scheduling information may be indicative of the plurality of PRBs by using one or more RBGs.

At block 7012, the transmission is blocked on at least one forbidden PRB which is included in the plurality of PRBs associated with the scheduling information. This is based on control information. As such, block 7012 can be inter-related to block 7002.

In order to compensate for any blocked PRBs, the transmission may be extended beyond the plurality of PRBs for which the scheduling information is received at block 7011. Hence, beyond the baseline time duration, an extension time duration can be implemented. The extension time duration can be determined, e.g., based on the count of the at least one forbidden PRB.

Figure 21:
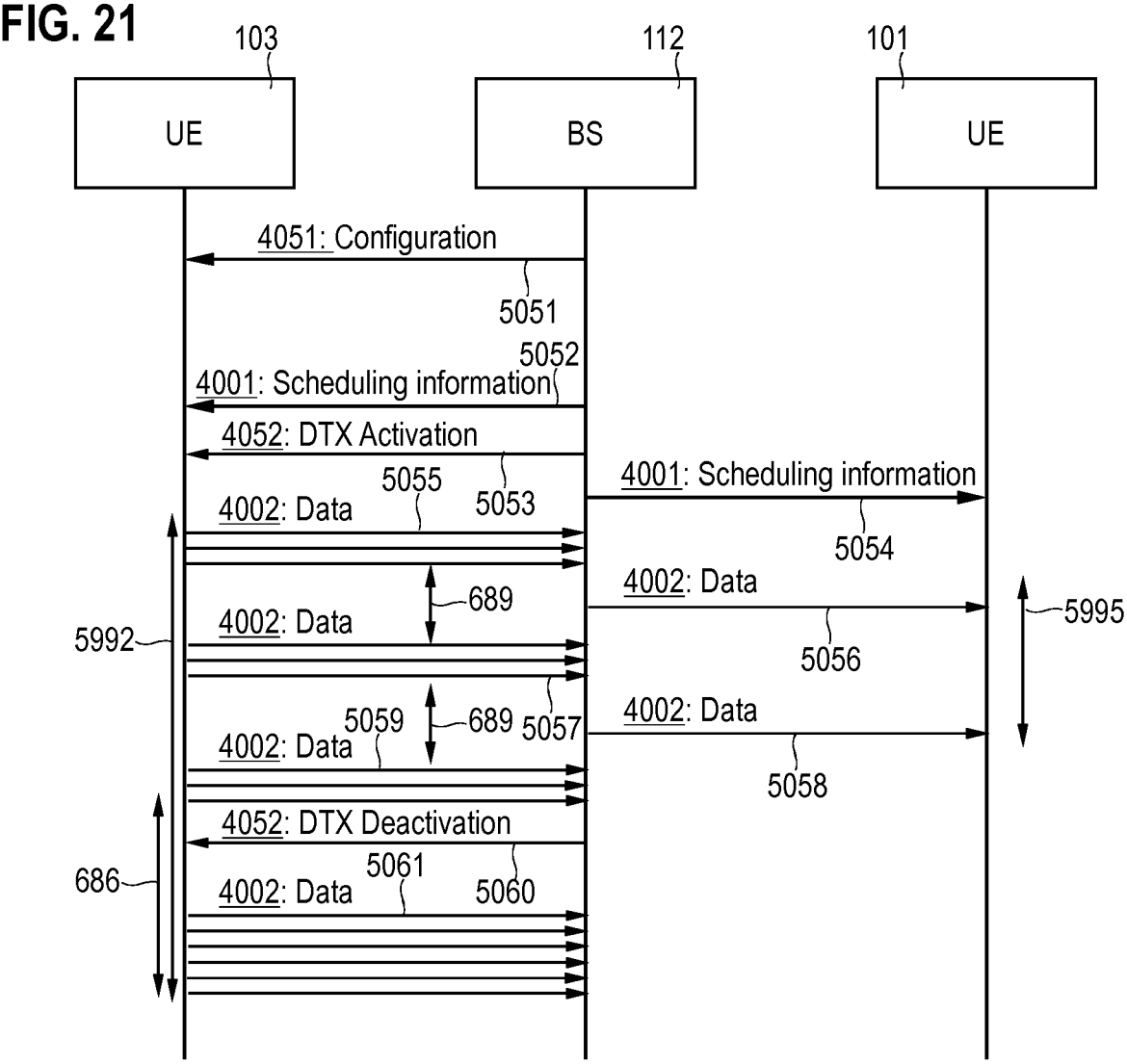
FIG. 21 is a signaling diagram of communication between a base station, and IOT UE, and a non-IOT UE according to various examples.

FIG. 21 is a signaling diagram illustrating communication between the BS 112, the IOT UE 103 and the non-IOT UE 101.

At 5051, a DL configuration control message 4051 is transmitted by the BS 112 and received by the UE 103. The DL configuration control message 4051 is indicative of control information on at least one forbidden PRB 680. For example, the DL configuration control information could be indicative of one or more DTX schedules which define the at least one forbidden PRB. For example, the DL configuration control message 4051 may be a Layer 3 RRC control message.

The DL configuration control message 4051 is generally optional. IN other scenarios, the at least one forbidden PRB 680 may be derived autonomously by the IOT UE 103 and the BS 112 from a cell configuration, e.g., including subbands and RBGs for scheduling (cf. FIG. 7).

Next, at block 5052, scheduling information 4001 is communicated from the BS 112 to the UE 103. The BS 112 transmits the scheduling information 4001 at 5052 and the UE 103 receives the scheduling information 4001 at 5052. The scheduling information 4001 is for an UL transmission 5992 between the IOT UE 103 and the BS 112. As such, the scheduling information 4001 is indicative of a plurality of PRBs, e.g., by means of one or more PRB groups. The plurality of PRBs is allocated to the UL transmission 5992.

At 5053, a DL activation control message 5052 is communicated from the BS 112 to the IOT UE 103. The DL activation control message 5052 activates blocking of the UL transmission 5992 in the at least one forbidden PRB 680. In some examples, where the DL configuration control message 4051 is indicative of a plurality of candidate DTX schedules, it would be possible that the DL activation control message 4052 is indicative of a selected one of the plurality of candidate DTX schedules.

In the scenario of FIG. 21, the DL activation control message 5052 is communicated at 5053, i.e., prior to commencing the UL transmission 5992 at 5055. In other scenarios, it would also be possible that the DL activation control message 5052 is communicated after commencing the UL transmission 5992 at 5055.

Next, at 5054, scheduling information 4001 is communicated from the BS 112 to the non-IOT UE 101. The scheduling information 4001 is for a transmission 5995 from the BS 112 to the UE 101.

The transmission 5992 is punctured at the BS 112 during blocking time durations 689. When puncturing the UL transmission 5992, the BS 112 can use the respective forbidden PRB 680 to implement the DL transmission 5995 by transmitting data is 4002 at 5056 and 5058. As illustrated in FIG. 21, thereby, the transmission 5992 and the transmission 5995 are interleaved in time domain.

Within the block in time duration 689, the UE 103 blocks the UL transmission 5992, on the forbidden PRBs 680 (in the example of FIG. 21, for sake of simplicity, a full blocking of the UL transmission 5992 is illustrated; while, generally, a partial blocking of the UL transmission 5992 would be possible, e.g., as illustrated in FIG. 7).

As illustrated in FIG. 21, the UL transmission 5992 includes multiple repetitions of the data 4002. Multiple repetitions are respectively communicated at 5055, 5057, 5059, and 5061. For example, each repetition of the data 4002 may correspond to encoded data according to the same redundancy version. Then, the BS 112 can combine each received repetitions on analogue domain in order to achieve CE. Thus, a receive buffer of the BS 112 is to be maintained until completion of the transmission 5992. As illustrated in FIG. 21, some repetitions are arranged prior to the blocking time durations 689, while other repetitions are arranged after the blocking time durations 689.

As a general rule, it is not required in all scenarios that the punctured and blocked transmission includes multiple repetitions. Other long dated transmissions—such as eMBB or URLLC—may also benefit from such approaches.

At 5060, a further DL activation control message causing the activation of the blocking is communicated from the BS 112 to the IOT UE 103. In response to receiving the DL activation control message 4052 at 5060, the UE 103 stops blocking the UL transmission 5992.

In order to compensate for the blocking during the blocking time duration 689, an extension count of repetitions of the UL transmission 5992 is implemented during the extension time duration 686. For example, beyond a baseline count of repetitions—e.g., defined by the CE level of the CE policy, typically under consideration of the signal quality of communicating between the IOT UE 103 and the BS 112—, an extension count of repetitions can be determined based on the count of forbidden PRB 680 during the blocking time duration 689.

Figure 22:
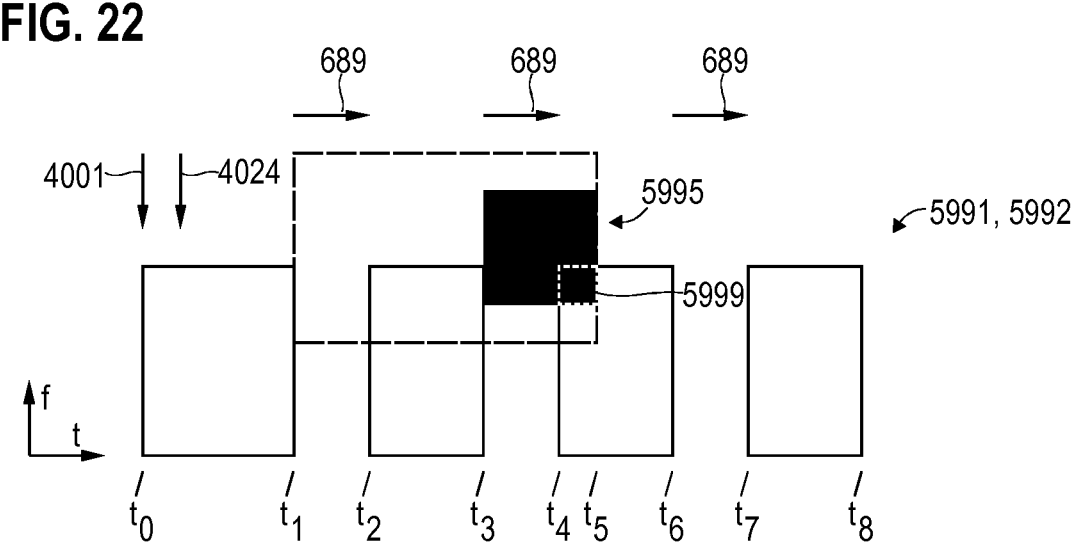
FIG. 22 schematically illustrates puncturing a first transmission and scheduling a second transmission in accordance with said puncturing and according to various examples.

FIG. 22 schematically illustration aspects with respect to puncturing a first transmission 5991, 5992 on at least one forbidden resource block and scheduling a second transmission 5995 in accordance with said puncturing. The transmission 5991, 5992 may be an UL transmission or a DL transmission. The transmission 5995 may be an UL or DL transmission; in the scenario of FIG. 22, for sake of simplicity, it is assumed that the transmission 5995 is an UL transmission.

FIG. 22 is an example implementation in which the transmission 5995 includes URLLC which is transmitted using UL grant-free resources. For example, respective scheduling information 4001 communicated from the BS 112 to one or more UEs 101, 102; the scheduling information 4001 can be indicative of a block of known PREs that are allocated for the transmission 5995.

These PREs of the UL transmission 5995 may not be allocated to only a single UE; i.e., these PREs may not be dedicated resources. Rather, multiple UEs may access the PREs, to increase spectrum utilization. There is no need to explicitly grant an individual UE. This allows the UE 101, 102 to transmit UL data on the grant-free resources without a specific scheduling request; the latency is reduced.

The transmission 5991, 5992 includes eMBB. Such transmission is typically grant-based, i.e., individually scheduled by the network.

If the transmission 5991, 5992 overlaps some of the grant-free resources (cf. FIG. 22) of the transmission 5995, then, if URLLC data is transmitted in the grant-free resources of the transmission 5995, it may be interfered by the eMBB data of the transmission 5991, 5992 (the overlap 5999 is illustrated using a dotted line in FIG. 22).

The BS 112 may not have a-priori knowledge on when URLLC data will be transmitted in a grant-free PRE of the transmission 5995. Hence, by implementing the eMBB transmission 5991, 5992 using a DTX schedule (cf. FIG. 22), at least some of the URLLC data of the transmission 5995—which is typically repeated for reliability purpose—would not be interfered when it coincides with the DTX gap, i.e., the blocking time duration 689 and the one or more forbidden PRBs 680. For URLLC data of the transmission 5995 which coincides with an ON duration of the DTX schedule, collision with eMBB data of the transmission 5991, 5992 is possible. On average, such puncturing of the transmission 5991, 5992 reduces the interference of the URLLC data in the grant-free transmission 5995.

In FIG. 22, the transmission 5991, 5992 is scheduled using scheduling information at time to.

For example, the transmission 5991, 5992 can be between UE 101 and BS 112.

The transmission 5991, 5992 partially overlaps a set of UL grant-free resources of the transmission 5995 (the allocated resources are illustrated using the dashed line).

While the UL grant-free resources of the transmission 5995 are allocated in the time interval t1-t4, only at time t3, UE 103 decides to use these grant-free resource to transmit the URLLC data (full black area in FIG. 22). Multiple repetitions of the URLLC data are implemented until time t5.

A DL activation control message 4024 activates the DTX schedule for the transmission 5991, 5992, e.g., in DCI. The DL activation control message 4024 is optional. Generally, the UE 101 could be statically configured with the DTX schedule.

In some examples, one or more respective forbidden PRBs may be fixedly configured at the UE 101 by provisioning respective control information.

Due to the DTX schedule, not all of the repetitions of the URLLC data are interfered by the transmission 5991, 5992. In some embodiment, the DTX schedule is only activated if the overlap 5999 between the transmission 5995 and the transmission 5991, 5992 is detected.

Summarizing, techniques have been described which rely on control information—e.g., indicated using DL control signaling—which is indicative of one or more forbidden/invalid PRBs. For example, an MTC transmission may thereby be at least partly blocked in accordance with the one or more forbidden PRBs. Then, an LTE or, generally, non-IOT UE may be scheduled on the one or more forbidden PRBs. RBGs can be used to indicate the one or more forbidden PRBs.

According to some aspects, a compensation for the one or more forbidden PRBs can be achieved by defining additional repetitions of a CE technique for the MTC transmission. These additional repetitions may be in addition to a baseline repetition count. The extension count of such additional repetitions may be signaled to the UE using DL control signaling, e.g., using a DL configuration control message or a DL activation control message as explained in connection with the various scenarios herein.

According to some aspects, a terminate and resume indication for the transmission to be blocked is described. A transmission gap results and may be used for scheduling one or more further UEs.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, while above various examples have been described with respect to multiple repetitions of data on PUSCH in eMTC using the CE technique, this is applicable to also PDSCH. Generally, various examples described for UL can be applied for DL, as well; and vice versa.

Also, such techniques are readily applicable in any other system where two or more transmission of different durations need to share partially or fully their resources. For example in NR, a long transmission such as enhanced Mobile Broadband (eMBB) with expected 20 Gbps throughput is pre-empted by a shorter transmission such as Ultra Reliable Low Latency Communication (URLLC), where the transmission cannot tolerate any latency and needs to be very reliable.

For further illustration, above, various examples have been described with respect to scenarios in which IOT UEs employ blocking of a transmission on one or more forbidden PRBs. However, such techniques may be readily applied for non-IOT UEs that can also be configured for blocking a transmission one or more forbidden PRBs.

The invention claimed is:

1. A method, for use in a wireless device, for performing transmissions on a wireless communication network, comprising:
   receiving scheduling information for an uplink transmission on a plurality of resource blocks;
   receiving, from a base station, control information configuring at least one invalid resource block included in the plurality of resource blocks;
   receiving, from a base station, at least one downlink activation control message for the control information; and
   blocking the uplink transmission on the at least one invalid resource block, the blocking is based on the received control information, and
   wherein the blocking comprises, upon starting the uplink transmission, at least one of activating or deactivating the blocking of the uplink transmission depending on the at least one downlink activation control message,
   wherein when the blocking of the uplink transmission is activated: transmission on the at least one invalid resource block is suspended, and
   wherein when the blocking of the uplink transmission is deactivated: transmission on the at least one invalid resource block is resumed.

2. The method of claim 1,
   wherein the uplink transmission comprises multiple repetitions of data,
   wherein the method further comprises:
   determining a count of the multiple repetitions of the data depending on a count of the at least one invalid resource block.

3. The method of claim 2, further comprising:
   receiving downlink control signaling indicative of a mapping between the count of the at least one invalid resource block and the count of the multiple repetitions,
   wherein the count of the multiple repetitions is further determined depending on the mapping.

4. The method of claim 2,
   wherein the count of the multiple repetitions comprises a baseline count and an extension count,
   wherein the extension count is determined depending on the count of the at least one invalid resource block.

5. The method of claim 1,
   wherein the uplink transmission comprises multiple repetitions of data,
   wherein the at least one downlink activation control message is indicative of sequence numbers associated with the multiple repetitions for which the blocking is activated.

6. The method of claim 1,
   wherein a first downlink activation control message of the at least one downlink activation control message activates the blocking of the uplink transmission,
   wherein a second downlink activation control message of the at least one downlink activation control message deactivates the blocking of the uplink transmission.

7. The method of claim 1,
   wherein the at least one downlink activation control message is indicative of a discontinuous transmission schedule of the activating or the deactivating of the blocking.

8. The method of claim 1, further comprising:
   based on a count of the at least one invalid resource block:
   determining an extension time duration for extending the uplink transmission beyond a baseline time duration defined by the scheduling information.

9. The method of claim 1, further comprising:
   receiving a downlink configuration control message indicative of the control information configuring at least one invalid resource block.

10. The method of claim 1,
    wherein the blocking comprises overriding the scheduling information with respect to the at least one invalid resource block.

11. A method, for use in a base station, for scheduling uplink transmissions on a wireless communication network, the method comprising:
    transmitting, to a wireless device, scheduling information for an uplink transmission on a plurality of resource blocks;
    transmitting, to the wireless device, control information configuring at least one invalid resource block included in the plurality of resource blocks; and
    sending, to the wireless device, at least one downlink activation control message for the control information, and
    wherein the uplink transmission is to be blocked on the at least one invalid resource block included in the plurality of resource blocks and wherein the downlink activation control message instructs the wireless device to activate or deactivate blocking of the uplink transmission depending on the at least one downlink activation control message,
    wherein when the blocking of the uplink transmission is activated: transmission on the at least one invalid resource block is suspended, and
    wherein when the blocking of the uplink transmission is deactivated: transmission on the at least one invalid resource block is resumed.

12. A method, for use in a base station, for scheduling transmissions on a wireless communication network, comprising:
    scheduling a first transmission between an access node and a first terminal,
    puncturing the first transmission on at least one invalid resource block,
    scheduling a second transmission between the access node and a second terminal on the at least one invalid resource block, and
    transmitting at least one downlink activation control message to the first terminal, at least one downlink activation control message causing the first terminal to activate or deactivate puncturing of the first transmission on the at least one invalid resource block in accordance with the at least one downlink activation control message,
    wherein when the puncturing of the first transmission is activated: transmission on the at least one invalid resource block is suspended, and
    wherein when the puncturing of the first transmission is deactivated: transmission on the at least one invalid resource block is resumed.

13. The method of claim 12,
    based on a count of the at least one invalid resource block:
    determining an extension time duration for extending the first transmission beyond a baseline time duration defined by the scheduling of the first transmission.

14. The method of claim 12,
wherein the first transmission is punctured in accordance with a discontinuous transmission schedule defining the at least one invalid resource block.

15. The method of claim 12,
wherein the scheduling of the first transmission comprises transmitting scheduling information for the first transmission on a plurality of resource blocks, the plurality of resource blocks including the at least one invalid resource block.

16. The method of claim 12,
wherein the puncturing of the first transmission comprises transmitting a downlink configuration control message indicative of control information on the at least one invalid resource block, the downlink configuration control message causing the first terminal to block the first transmission on the at least one invalid resource block.

17. The method of claim 12,
wherein the first transmission is on a subband of a carrier, and
wherein the second transmission is across the carrier.

18. The method of claim 12, further comprising:
wherein the puncturing of the first transmission comprises transmitting a downlink configuration control message indicative of control information on at least one discontinuous transmission schedule defining the at least one invalid resource block.

19. The method of claim 12, further comprising:
detecting an overlap between the first transmission and the second transmission,
wherein the puncturing of the first transmission is in response to the detecting of the overlap.

20. The method of claim 1,
wherein the uplink transmission is on a subband of a carrier,
wherein the at least one invalid resource block is associated with a scheduling resource block group having an overlap with a part of the carrier which is outside of the subband,
wherein the at least one invalid resource block optionally comprises all resource blocks of the scheduling resource block group, and
wherein the uplink transmission is blocked if the overlap is larger than a predefined threshold.

21. The method of claim 11,
wherein the uplink transmission comprises multiple repetitions of data,
wherein the method further comprises:
determining a count of the multiple repetitions of the data depending on a count of the at least one invalid resource block.

22. The method of claim 11, the blocking comprises overriding the scheduling information with respect to the at least one invalid resource block.

\* \* \* \* \*